United States Patent
Castillo, Jr.

(10) Patent No.: US 11,111,983 B1
(45) Date of Patent: Sep. 7, 2021

(54) END FITTING ASSEMBLY FOR A TIE-DOWN STRAP AND A TIE-DOWN STRAP FORMED THEREWITH

(71) Applicant: Frank M. Castillo, Jr., Bourbonnais, IL (US)

(72) Inventor: Frank M. Castillo, Jr., Bourbonnais, IL (US)

( * ) Notice: Subject to any disclaimer, the term of this patent is extended or adjusted under 35 U.S.C. 154(b) by 0 days.

(21) Appl. No.: 16/832,971

(22) Filed: Mar. 27, 2020

Related U.S. Application Data

(60) Provisional application No. 62/825,131, filed on Mar. 28, 2019.

(51) Int. Cl.
*F16G 11/12* (2006.01)
*A44B 11/18* (2006.01)
*B60P 7/08* (2006.01)

(52) U.S. Cl.
CPC .............. *F16G 11/12* (2013.01); *A44B 11/18* (2013.01); *B60P 7/0807* (2013.01)

(58) Field of Classification Search
CPC ......... A44B 11/18; B60P 7/0807; F16G 11/12
See application file for complete search history.

(56) References Cited

U.S. PATENT DOCUMENTS

| | | | | |
|---|---|---|---|---|
| 1,997,653 A * | 4/1935 | Reiter | ..................... | A44B 11/18 24/193 |
| 3,335,468 A * | 8/1967 | Harley | ..................... | F16G 11/10 24/115 R |
| 4,670,945 A * | 6/1987 | Banks | ..................... | A44B 11/18 24/170 |
| 8,056,191 B2 * | 11/2011 | Crye | ..................... | A44B 11/10 24/197 |
| 8,381,366 B2 * | 2/2013 | Hede | ..................... | A44B 11/18 24/170 |
| D713,293 S * | 9/2014 | Gurule | ..................... | D11/212 |
| 9,986,790 B2 * | 6/2018 | Ness | ..................... | A44B 11/04 |
| 10,517,357 B2 * | 12/2019 | Ressler | ..................... | A44B 11/18 |
| 2007/0226961 A1 * | 10/2007 | Anderson | ..................... | A44B 11/2588 24/170 |

* cited by examiner

*Primary Examiner* — Robert Sandy
*Assistant Examiner* — Louis A Mercado
(74) *Attorney, Agent, or Firm* — Parsons & Goltry, PLLC; Michael W. Goltry; Robert A. Parsons

(57) ABSTRACT

An end fitting assembly for installation on a tie-down strap includes an end fitting including a proximal extremity, a distal extremity configured to secure an anchor point, and a first opening between the proximal extremity and the distal extremity, and a coupling including an inner end, an outer end, and a second opening between the inner end and the outer end, the inner end being connected to the end fitting for movement of the coupling into and out of a closed position in which the outer end is in juxtaposition with the first opening and the second opening is in juxtaposition with the end fitting between the distal extremity and both the first opening and the outer end.

6 Claims, 21 Drawing Sheets

END FITTING ASSEMBLY FOR A TIE-DOWN STRAP AND A TIE-DOWN STRAP FORMED THEREWITH

CROSS-REFERENCE TO RELATED APPLICATION

This application claims the benefit of U.S. Provisional Patent Application No. 62/825,131, filed 28 Mar. 2019, which is incorporated herein by reference.

FIELD OF THE INVENTION

The present invention relates to load securing.

More particularly, the present invention relates to tie-down straps used to secure loads, including ratchet straps and other forms of tie-down straps.

In a further and more specific aspect, the present invention concerns a coupling assembly useful for securing a tie-down strap without having to form a standard fixed loop in the tie-down strap and without having to use specialized equipment or separate fasteners.

BACKGROUND OF THE INVENTION

Load securing, also known as cargo securing, is the securing of cargo for transportation. When cargo is not property secured, it can become loose, break away and cause disasters on the roadway. The cargo may fly or roll off and collide with other vehicles, or it may fall off and cause vehicles to collide with each other or fixed objects in an attempt to avoid the material.

Tie-down straps (also called ratchet straps, lashing straps or tie downs) are fasteners routinely used to hold down cargo or equipment during transport. Tie-down straps comprise webbing, a strong fabric woven as a flat strip or tube of varying width and fibers, often used in place of rope, and outfitted with tie down hardware. This hardware includes fasteners, buckles, and end fittings, which enable the tie-down strap to attach to the area surrounding the cargo or equipment, loop over the cargo or equipment, attach to the cargo or equipment, and be tensioned.

Common fasteners include cam, over-the-center, and ratchet. Cam fasteners employ a cam to push against the webbing extending through the cam to prevent the webbing from slipping back through the fastener. An edge of the cam lever that confronts the webbing is usually knurled or textured to provide a firmer grip on the webbing. Tension is introduced by pulling the excess webbing through the fastener until the necessary tension is achieved and releasing the cam lever to lock the webbing in place.

Over-center fasteners require a more complex threading procedure but can introduce comparatively more tension in the webbing than the cam fasteners. When the fastener is open, one can feed the excess webbing through the fastener. When the slack is removed, closing the fastener adds tension to the webbing and holds the tension tightly in place.

Ratchet fasteners are the most complex of the three fasteners to thread, but offer advantages in taking up the slack in the webbing and tensioning the assembly. After the webbing is threaded through the fastener, the ratcheting mechanism is used to take up the slack and tension the assembly to a desired level. The ratcheting mechanism functions like a socket wrench, by opening and closing the fastener repeatedly to pull the webbing through the fastener. Releasing the tension is only a matter of depressing the release lever and pulling the webbing back through the fastener.

There are several types of buckles utilized in tie-down straps, the most common being threaded buckles and snap buckles. Threaded buckles work like those found on backpacks and duffel bags for adjusting the length of the tie-down strap. Snap buckles are also utilized with backpacks and duffel bags to allow fastening of the strap. These buckles are often used in conjunction with one another, the threading buckle providing tension and the snap buckle providing fastening. While threaded buckles are typically of metal and used with tensioning fasteners like over-center and ratchet fasteners, snap buckles are typically of plastic and not designed to withstand a great deal of tension.

Like the fasteners and buckles, there are several types of end fittings utilized in tie-down straps to secure anchor points. Common end fittings include hooks, such flat hooks, J hooks, D hooks, S hooks, and track fittings. The end fittings are typically chosen to correspond to the particular use of the tie-down strap and to the given anchor points, whether edges, loops, hooks, tracks, etc. Accordingly, it is often necessary to have numerous tie-down straps on hand at substantial cost to the user depending on the load to be secured and the anchor points. Furthermore, the end fittings ordinarily include an opening secured by a fixed loop in the tie-down strap. Unfortunately, the fixed loop can break due to wear or excessive tension applied to the webbing, which releases the end fitting and renders the tie-down strap unusable.

SUMMARY OF THE INVENTION

According to the principle of the invention, an end fitting assembly for installation on a tie-down strap includes an end fitting including a proximal extremity, a distal extremity configured to secure an anchor point, and a first opening between the proximal extremity and the distal extremity, and a coupling including an inner end, an outer end, and a second opening between the inner end and the outer end, the inner end being connected to the end fitting for movement of the coupling into and out of a closed position in which the outer end is in juxtaposition with the first opening and the second opening is in juxtaposition with the end fitting between the distal extremity and both the first opening and the outer end. The coupling is connected to the end fitting for movement of the coupling into and out of the closed position by a pivot. The pivot includes a shaft carried by one of the end fitting and the coupling about which a collar of the other one of the end fitting and coupling rotates. The shaft is integral with the one of the end fitting and the coupling. The end fitting defines a third opening between the first opening and the distal extremity, and the shaft and the collar reside in the third opening. The first opening and the second opening are elongate and parallel with respect to one another.

According to the principle of the invention, a tie-down strap and end fitting assembly configuration includes a tie-down strap including an end, an end fitting including a proximal extremity, a distal extremity configured to secure an anchor point, and a first opening between the proximal extremity and the distal extremity, and a coupling including an inner end, an outer end, and a second opening between the inner end and the outer end, the inner end being connected to the end fitting for movement of the coupling into and out of a closed position in which the outer end is in juxtaposition with the first opening and the second opening is in juxtaposition with the end fitting between the distal extremity and both the first opening and the outer end. The end of the tie-down strap is threaded through the first opening and the second opening and doubled back through the first opening over a standing part of the tie-down strap in which a loop is formed in the tie-down strap around the outer end, and the loop is secured by being tightened about the outer end, the coupling held by the tightened loop into the closed position of the outer end, by at least one of the end of the tie-down strap and the standing part of the tie-down strap being pulled.

The coupling is connected to the end fitting for movement of the coupling into and out of the closed position by a pivot. The pivot includes a shaft carried by one of the end fitting and the coupling about which a collar of the other one of the end fitting and coupling rotates. The shaft is integral with the one of the end fitting and the coupling. The end fitting defines a third opening between the first opening and the distal extremity, and the shaft and the collar reside in the third opening. The first opening and the second opening are elongate and parallel with respect to one another.

According to the principle of the invention, a method includes providing a tie-down strap including an end, an end fitting including a proximal extremity, a distal extremity configured to secure an anchor point, and a first opening between the proximal extremity and the distal extremity, and a coupling including an inner end, an outer end, and a second opening between the inner end and the outer end, the inner end being connected to the end fitting for movement of the coupling into and out of a closed position in which the outer end is in juxtaposition with the first opening and the second opening is in juxtaposition with the end fitting between the distal extremity and both the first opening and the outer end of the coupling, and threading the end of the tie-down strap through the first opening and the second opening while the coupling is out of the closed position, doubling back the end of the tie-down strap through the first opening over a standing part of the tie-down strap through the first opening forming a loop in the tie-down strap around the outer end, and securing the loop by tightening it about the outer end thereby persuading movement of the coupling to the closed position of the outer end by pulling at least one of the end of the tie-down strap and the standing part of the tie-down strap. The coupling is connected to the end fitting for movement of the coupling into and out of the closed position by a pivot. The pivot includes a shaft carried by one of the end fitting and the coupling about which a collar of the other one of the end fitting and coupling rotates. The shaft is integral with the one of the end fitting and the coupling. The end fitting defines a third opening between the first opening and the distal extremity, and the shaft and the collar reside in the third opening. The first opening and the second opening are elongate and parallel with respect to one another.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Figure 1:
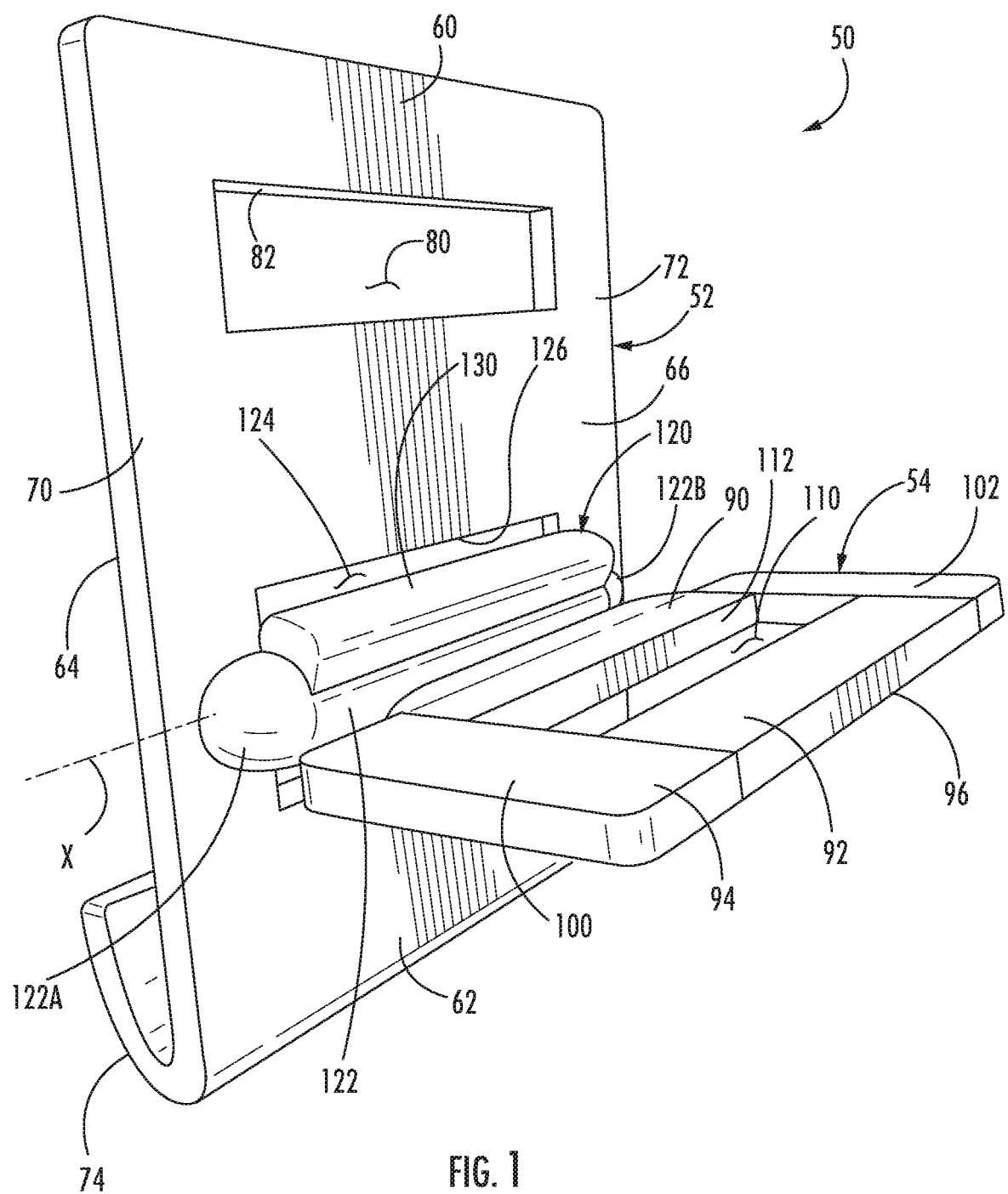
FIGS. 1-4 are perspective views of an end fitting assembly constructed and arranged in accordance with the principle of the invention, the end fitting assembly including an end fitting configured to secure an anchor point, and coupling pivoted to the end fitting.
Figure 2:
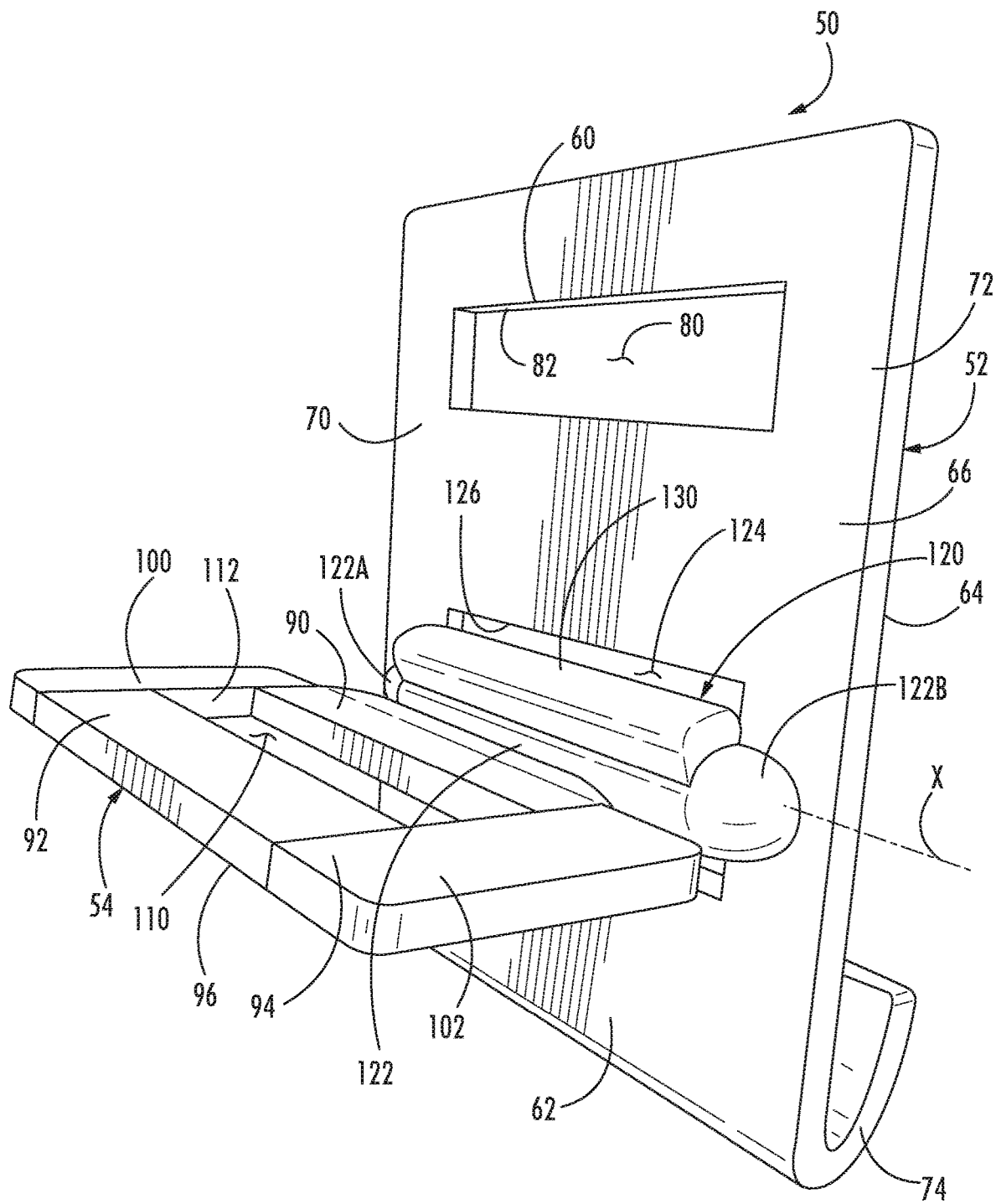
Figure 3:
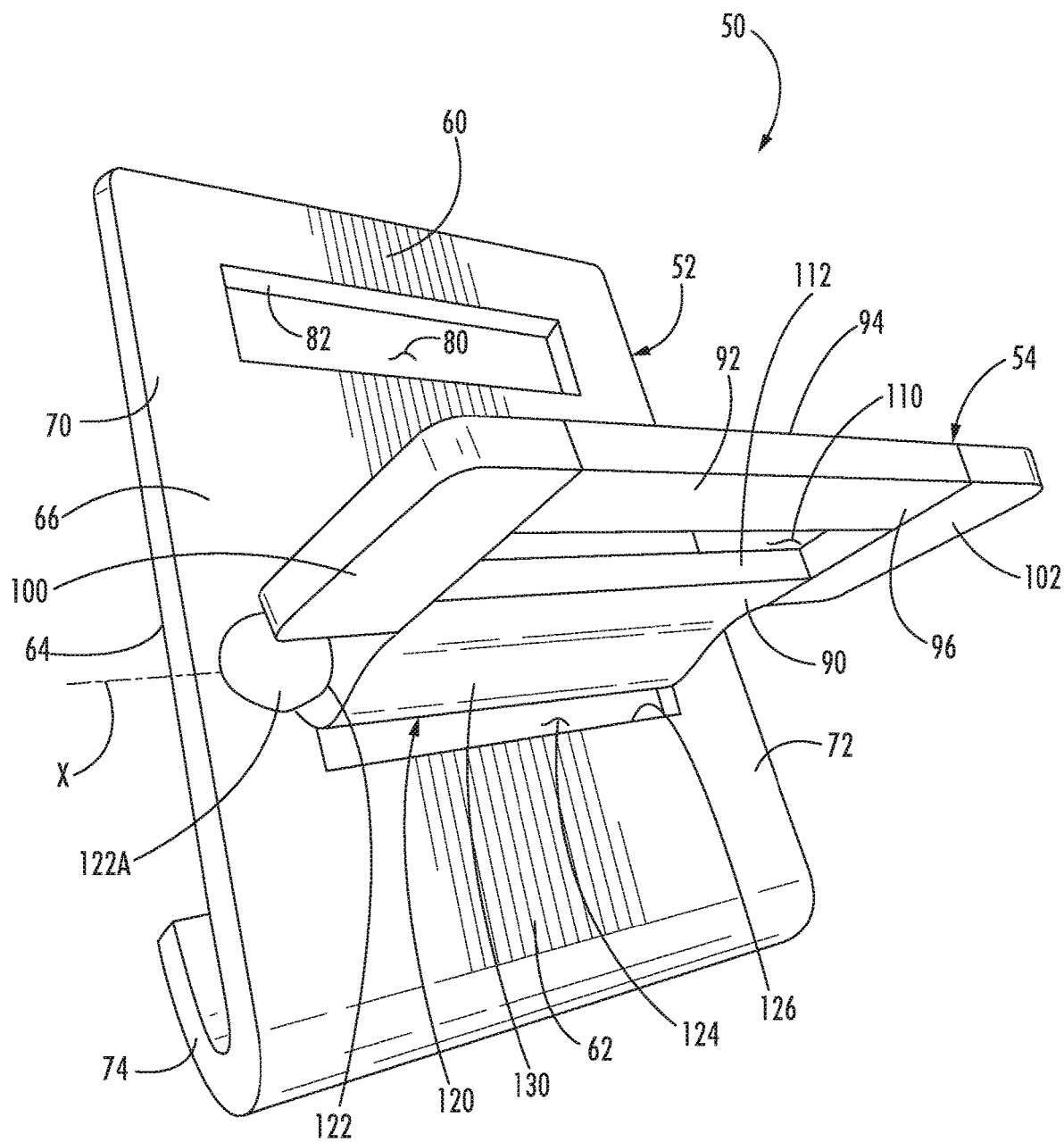
Figure 4:
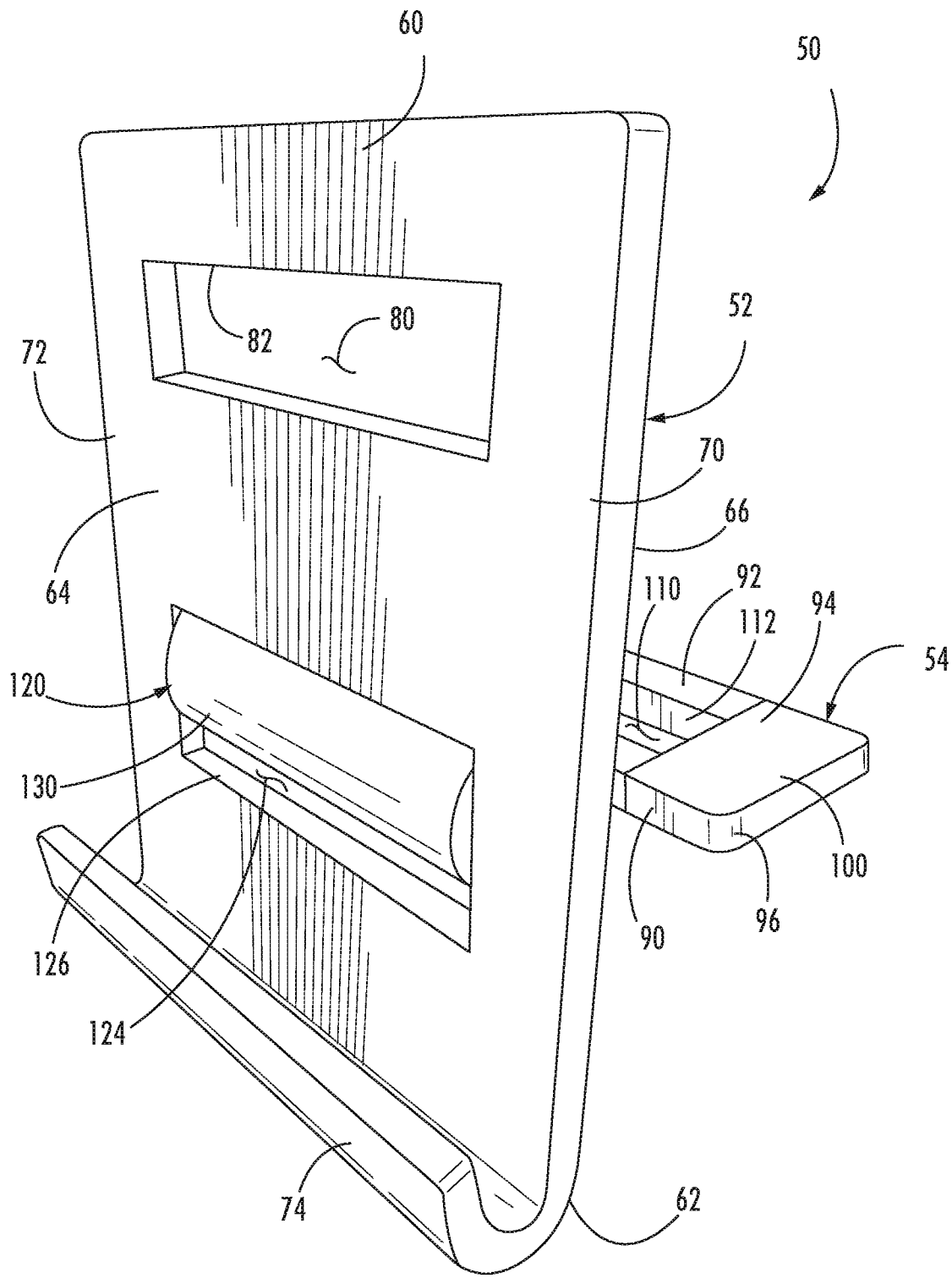
Figure 5:
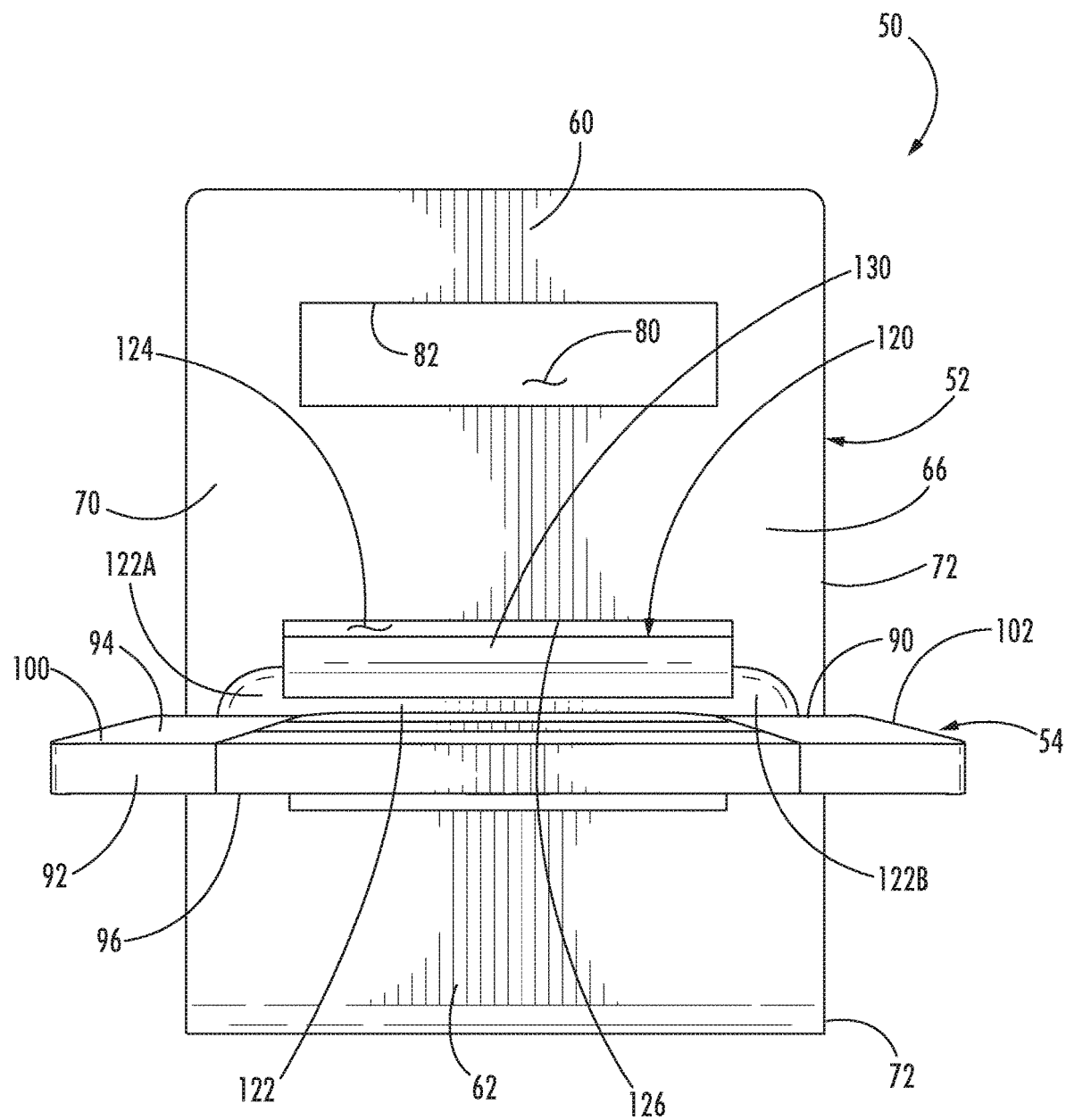
FIG. 5 is front view of the embodiment of FIGS. 1-4.
Figure 6:
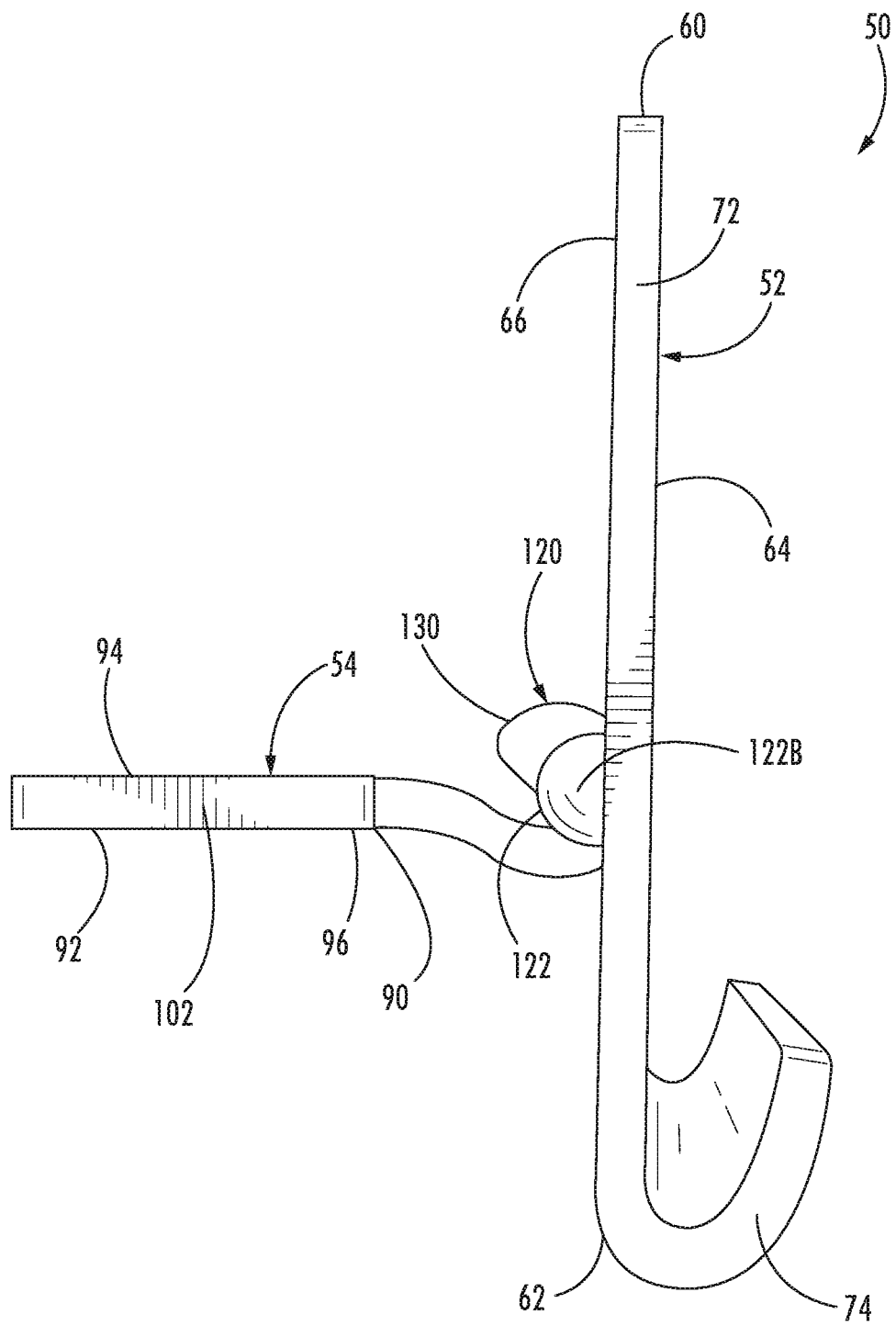
FIG. 6 is a side view of the embodiment of FIGS. 1-5, the opposite side view being the mirror image thereof.

Tie-down straps are straps used to secure loads, such on flatbed trucks, transport trailers, transport pallets, transport containers, etc. Conventional and readily-available tie-down straps are 1-4 inches wide, flat and customarily fashioned of heavyweight polypropylene webbing, polyester webbing, nylon webbing, or the like, and incorporate attached end fittings used to secure engagement or anchor points to enable the tie-down strap to be tightened therebetween and held against a load.

Of particular significance are ratchet straps. A ratchet strap, a type of tie-down strap, is commonly used in many areas of commerce including, for example, securing and hauling freight. A ratchet strap typically has a fixed-length or rear strap including a rear end fitting, and a variable-length or front strap having a front end fitting. The front and rear straps are each tie-down straps. The front strap is operatively connected to a ratchet fastener/mechanism capable of reducing the length of the front strap between the rear and front end fittings for tightly securing a load to a transport trailer or the like. The ratchet mechanism includes a mandrel with a slot therein. The front strap is slid into the slot until a chosen amount of slack has been removed between the mandrel and the front end fitting. The length of the front strap between the mandrel and the front end fitting is longer if the straps are expanding across a small length, and is decreased as the straps extend across a larger length.

The mandrel has an attached ratchet wheel formed with cams. The cams are sufficient to allow a frame pawl to be persuaded away from the ratchet wheel upon rotation in one direction and to oppose rotation in the opposite direction. The frame pawl is persuaded toward the ratchet wheel by a frame spring. A mechanism is typically provided to allow the frame pawl to be disengaged from the cams of the ratchet wheel thereby allowing release of the strap.

A ratchet handle rotates the ratchet wheel, and the attached mandrel. As the mandrel rotates the front strap wraps around the mandrel thereby tightening the strap around the item being secured between the rear end fitting and the front end fitting. A ratchet pawl slidably attached to the ratchet handle engages with the cams of the ratchet wheel. As the handle is moved in an arcuate motion, the mandrel rotates thereby wrapping front strap therearound. As the mandrel rotates a sufficient amount the counter-rotation is prohibited by the frame pawl engaging successive cams. A ratchet spring persuades the ratchet pawl into engagement with the cams. As the handle is rotated back in an opposite direction, the ratchet pawl is persuaded away from the cam until a position is reached wherein additional rotation of the sprocket can begin. A ratchet release handle is provided for persuading the ratchet pawl out of engagement with the ratchet wheel thereby allowing the front strap to be released. The ratchet release handle and frame pawl release handle may be separate, integral or operable in a single operation. In one embodiment the ratchet pawl is withdrawn and the handle rotated to a position where the ratchet pawl release handle is engaged with a rest stop, which also disengages the frame pawl thereby allowing for free rotation of the mandrel. The handle includes a pair of side supports with a grip extending there between. The handle is substantially U-shaped, with the open end toward the mandrel.

The rear strap is customarily formed with a fixed loop that secures the rear end fitting. The front strap is similarly formed with a fixed loop that secures the front end fitting. Over time and extended use, the material of the rear and front straps forming the loops can weaken and break resulting in the front and rear end fittings breaking away essentially rendering the rear and front straps unusable. Illustrative embodiments of the invention solve at least this problem in an end fitting assembly uniquely configured to secure a tie-down strap without having to form a secured loop in the tie-down strap and without the need for specialized tools or separate fasteners for easily and quickly replacing the original end fitting when the original strap attachment to the original end fitting fails causing the original end fitting to break away. It is to be understood that the end fitting assembly can be used with tie-down straps incorporating cam, over-the-center, or other chosen fastener/mechanism in place of the ratchet fastener/mechanism.

Turning now to the drawings, in which like reference characters indicate corresponding elements throughout the several views, attention is first directed to FIG. 1, in which there is seen end fitting assembly 50. End fitting assembly 50 includes end fitting 52 and coupling 54. End fitting 52 and coupling 54 are each formed of steel, titanium, aluminum, or other material or combination of materials having inherently strong, rugged, resilient, and shock-resistant material characteristics suitable for use in a tie-down strap, including with the rear strap or the front strap described above.

End fitting 52 includes proximal extremity 60, distal extremity 62, inner surface 64, outer surface 66, and opposite sides 70 and 72 extending from proximal extremity 60 to distal extremity 62. Distal extremity 62 is configured to secure an anchor point. Opening 80 extends through the thickness of end fitting 52 from inner surface 64 to outer surface 66. Opening 80 is proximate to proximal extremity 60, is closed, being uninterrupted and encircled by perimeter edge 82 of the material of end fitting 52 between sides 70 and 72 and between proximal extremity 60 and distal extremity 62, is elongate, being exemplary of a slot opening, and is parallel relative to proximal extremity 60 and distal extremity 62. In this example opening 80 is generally rectangular in shape.

In this embodiment, end fitting 52 is flat, and distal extremity 62 is a hook 74, end fitting 52 being a form of a coupling for hooking onto a chosen anchor point. Hook 74 is hooked upwardly opposing inner surface 64. Accordingly, end fitting 52 is exemplary of a form of a flat hook. Those having regard for the art will readily appreciate that distal extremity 62 can be selectively configured as any form of hook, track coupling, or other chosen form of coupling depending on the intended use of end fitting 52 and the given anchor point intended to be secured, whether an edge, loop, eyelet, hook, track, etc.

Coupling 54 includes inner end 90, outer end 92, inner surface 94, outer surface 96, and opposite sides 100 and 102 extending from inner end 90 to outer end 92. Opening 110 extends through the thickness of coupling 54 from inner surface 94 to outer surface 96. Opening 110 is centrally located in this example, is closed, being uninterrupted and encircled by perimeter edge 112 of the material of coupling 54 between sides 100 and 102 and between inner end 90 and outer end 92, is elongate, being exemplary of a slot opening, and is parallel relative to inner end 90 and outer end 92, proximal extremity 60, and distal extremity 62, and opening 80. In this example, opening 110 is generally rectangular in shape.

Figure 7:
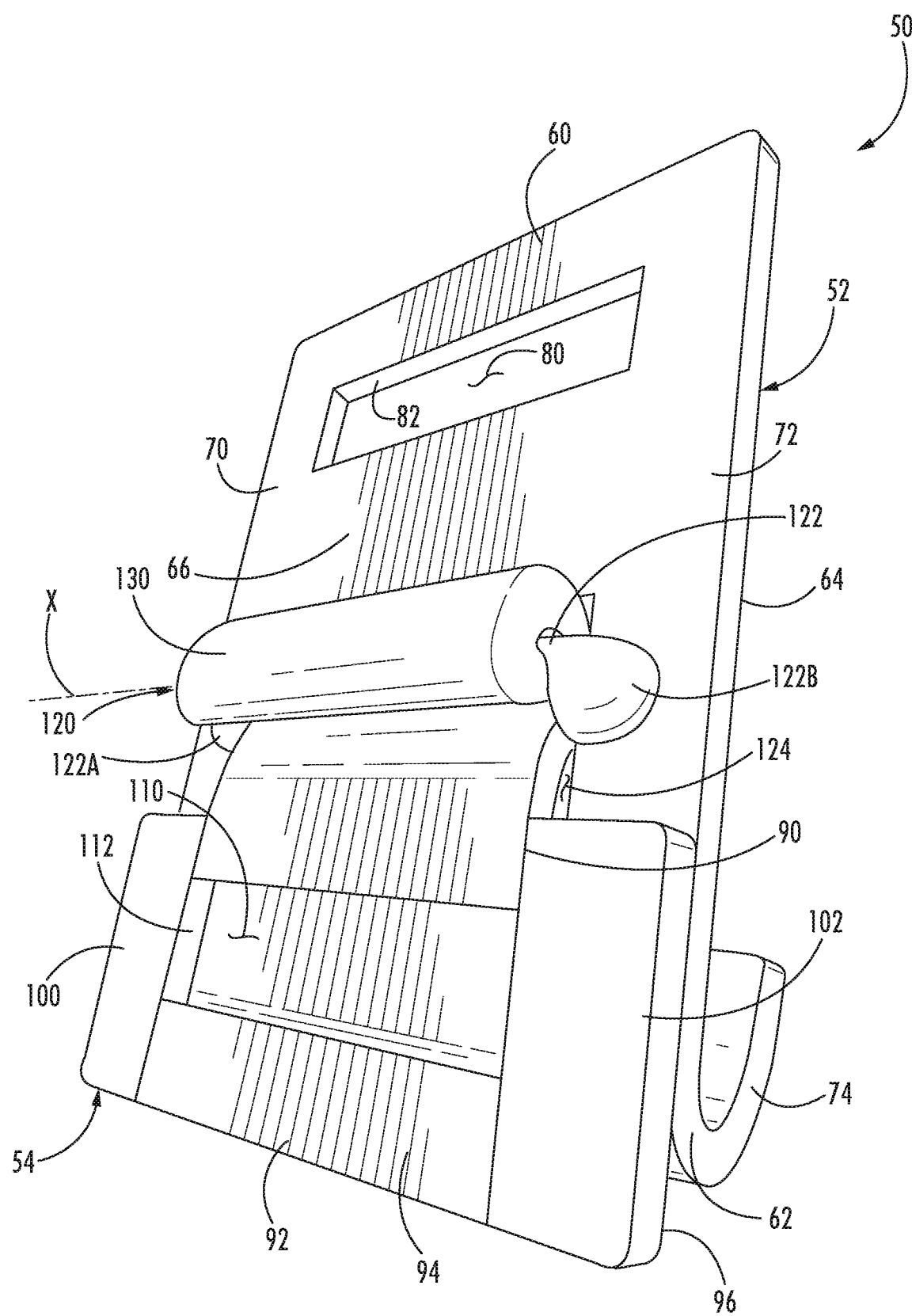
FIG. 7 is a perspective view of the end fitting assembly illustrating the coupling as it would appear pivoted to a lowered position in juxtaposition with the end fitting from an intermediate position of the coupling in FIGS. 1-6.
Figure 8:
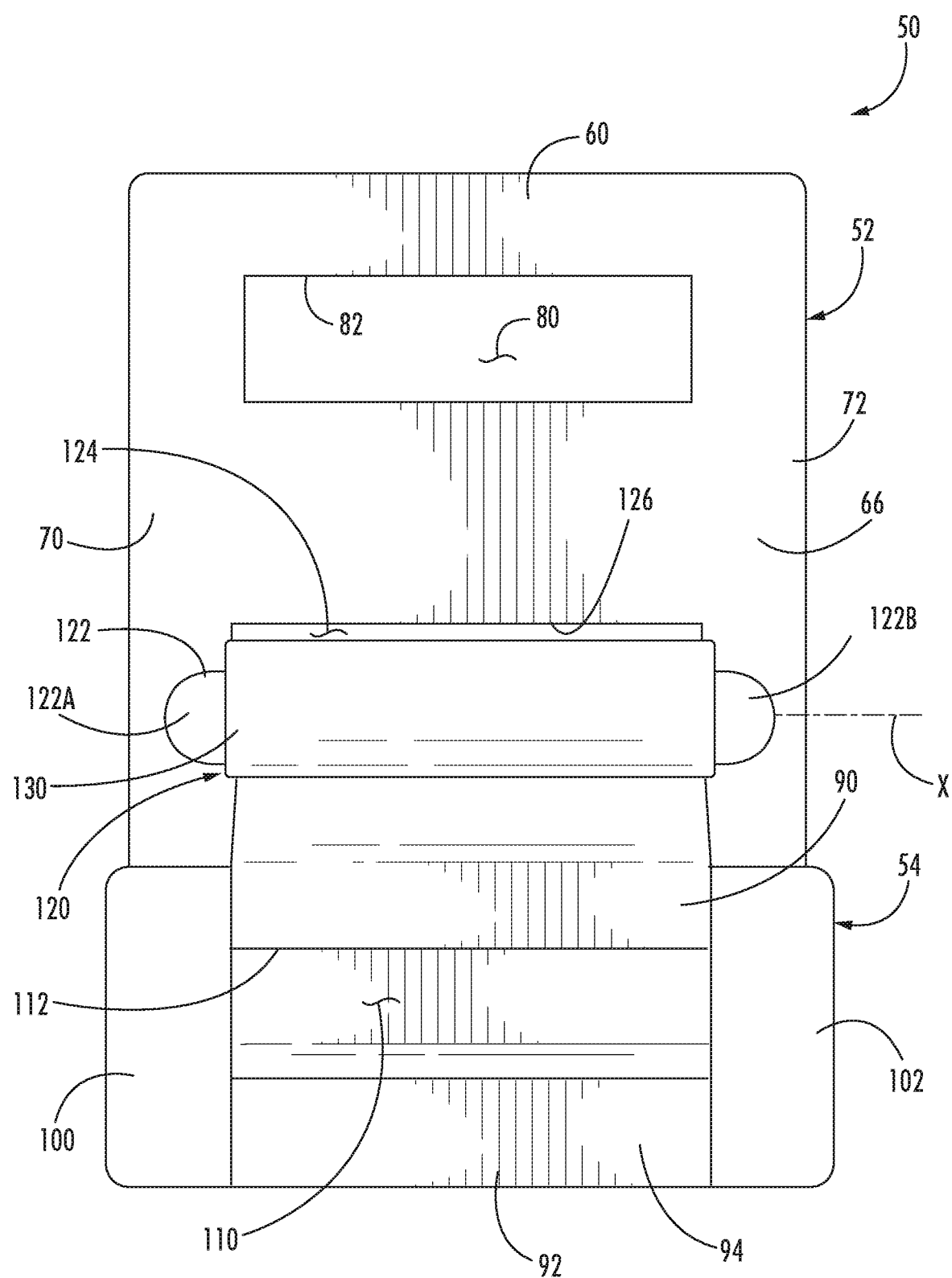
FIG. 8 is a front view of the embodiment of FIG. 7.
Figure 9:
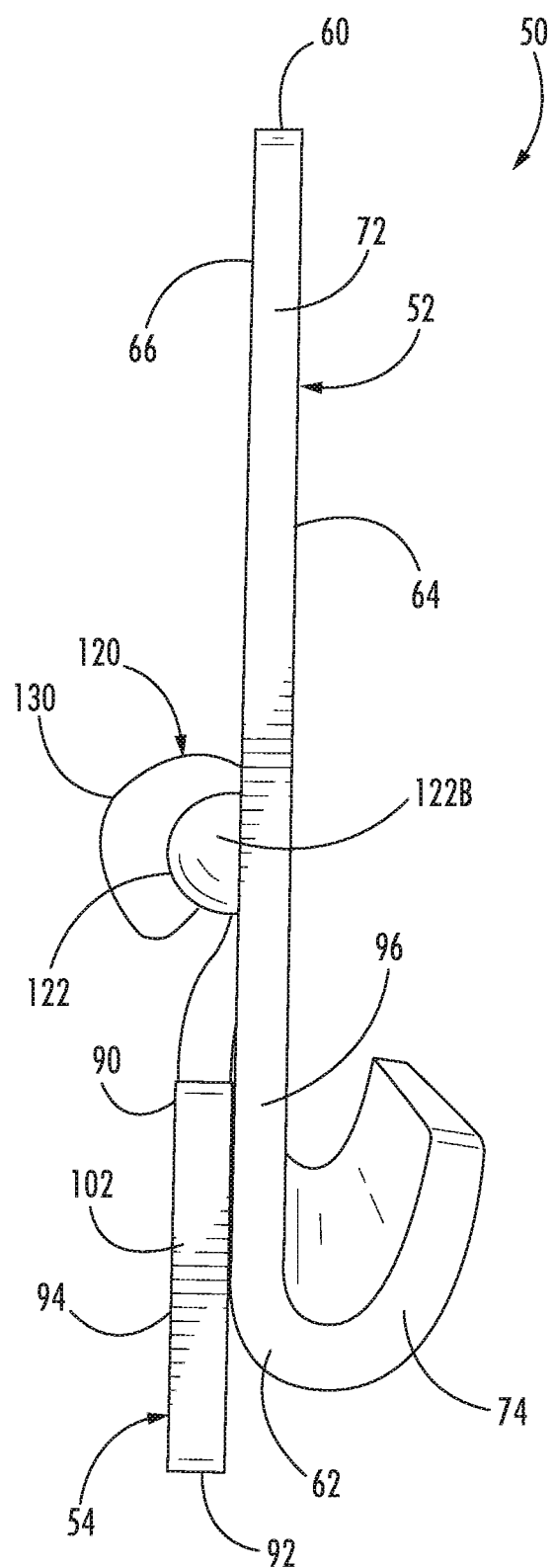
FIG. 9 is a side view of the embodiment of FIG. 7, the opposite side view being the mirror image thereof.
Figure 10:
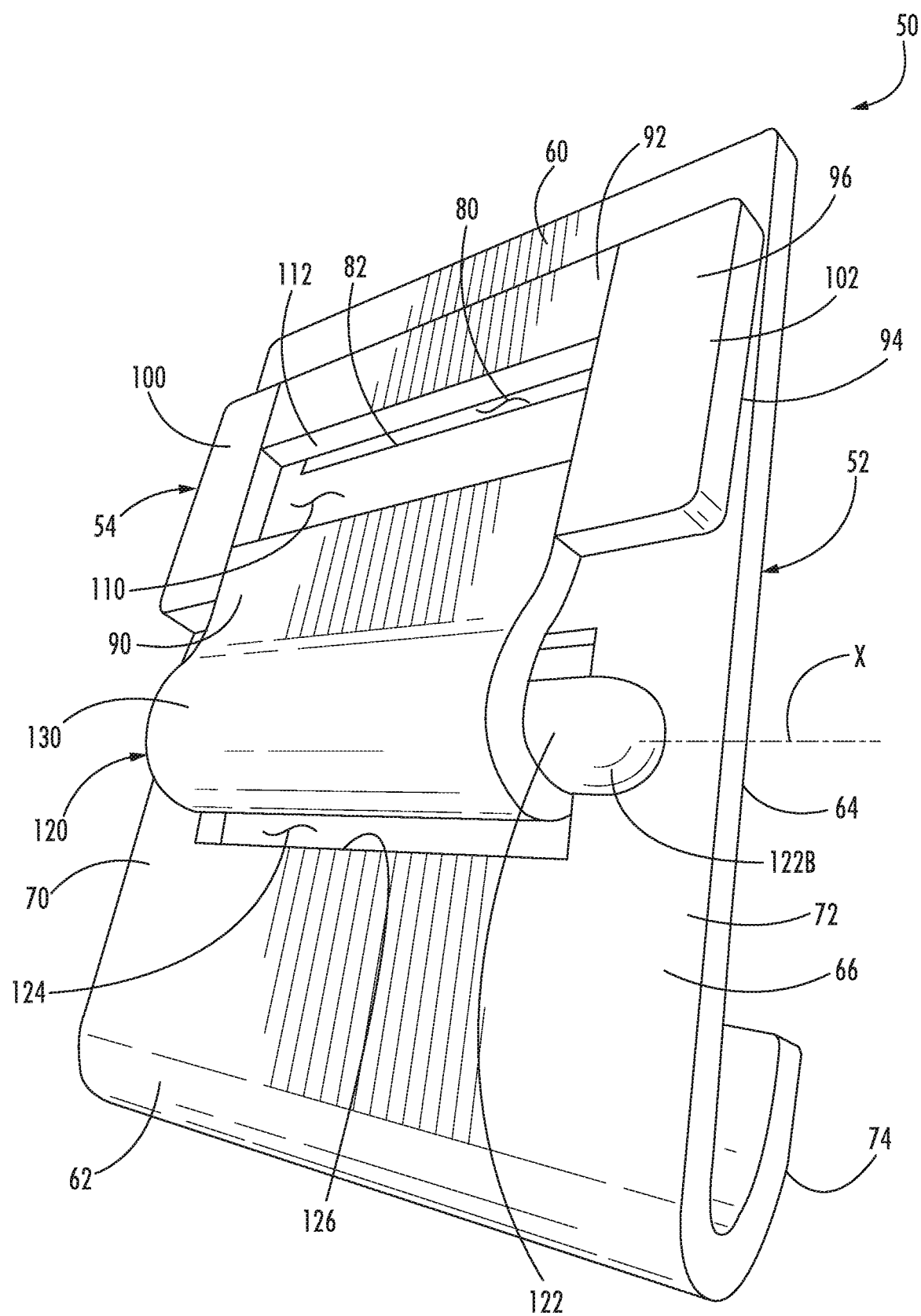
FIG. 10 is a perspective view of the end fitting assembly illustrating the coupling pivoted to a raised position in juxtaposition with the end fitting from the intermediate position of the coupling in FIGS. 1-6.
Figure 11:
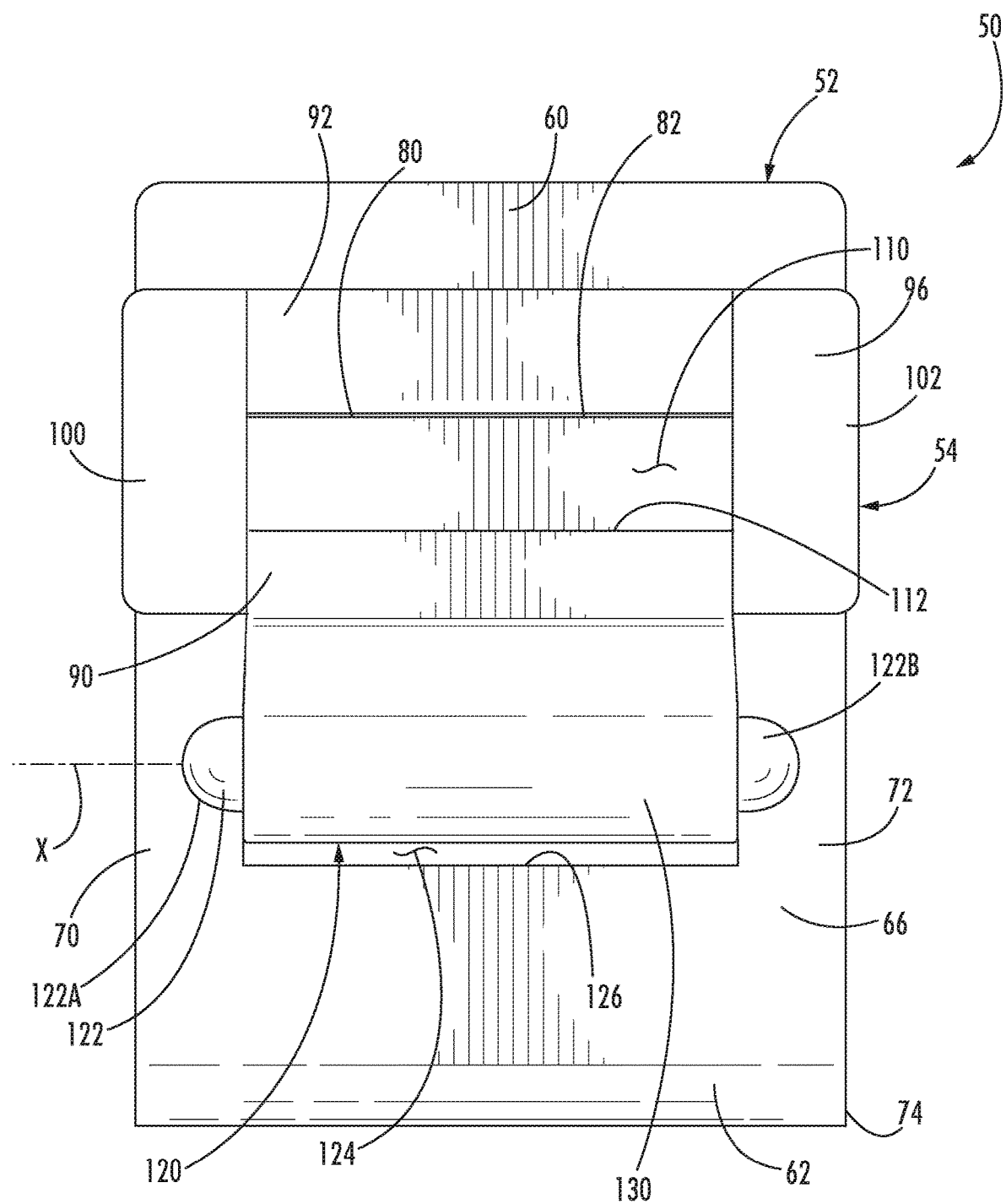
FIG. 11 is a front view of the embodiment of FIG. 10.
Figure 12:
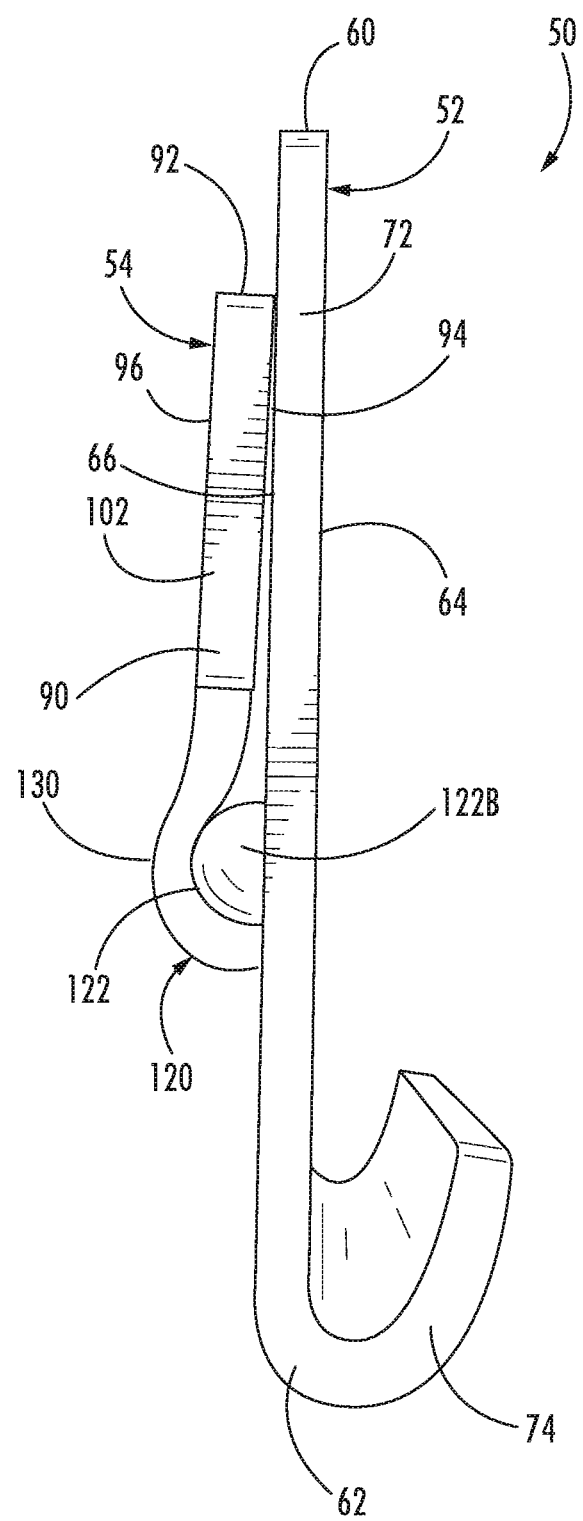
FIG. 12 is a side view of the embodiment of FIG. 10, the opposite side view being the mirror image thereof.

Inner end 90 of coupling 54 is connected to end fitting 52 for movement of coupling 54 between a lowered position in FIGS. 7-9 and a raised position in FIGS. 10-12. More specifically, inner end 90 of coupling 54 is connected to end fitting 52 at an intermediate position between opening 80 and distal extremity 62 for movement of coupling 54 between its lowered position in FIGS. 7-9 and its raised position in FIGS. 10-12. FIGS. 1-6 illustrate coupling 54 as it would appear pivoted to an intermediate or open position between the lowered position in FIGS. 7-9 and the raised position in FIGS. 10-12, in which the coupling 54 extends outwardly from outer surface 66 of end fitting 52 from inner end 90 to outer end 92.

In the illustrative embodiment of end fitting assembly 50, inner end 90 of coupling 54 is connected to end fitting 52 at the intermediate position between opening 80 and distal extremity 62 for movement of coupling 54 between its lowered position in FIGS. 7-9 and its raised position in FIGS. 10-12 by a hinge or pivot 120. Hinge or pivot 120 enables hinged movement of coupling 54 about axis X of rotation of pivot 120 between its lowered position in FIGS. 7-9 and its raised position in FIGS. 10-12.

Referring in relevant part to FIGS. 1-5, pivot 120 includes a shaft 122 about which a collar 130 rotates about axis X of rotation, which is parallel relative to proximal extremity 60, distal extremity 61, and opening 80. In this example, shaft 122 is carried by end fitting 52, and collar 130 is carried by coupling 54.

Opening 124 extends through the thickness of end fitting 52 from inner surface 64 to outer surface 66. Opening 124 is located at an intermediate position between opening 80 and distal extremity 62, is closed, being uninterrupted and encircled by perimeter edge 126 of the material of end fitting 52 between sides 70 and 72 and between opening 80 and distal extremity 62, is elongate, being exemplary of a slot opening, and is parallel relative to proximal extremity 60, distal extremity 62, and opening 80. In this example, opening 124 is generally rectangular in shape.

Shaft 122 is elongate and resides in and extends across opening 124 at the intermediate position of opening 124 between opening 80 and distal extremity 62 from end 122A of shaft 122 affixed to side 70 to end 122B of shaft 122 affixed to side 72. Ends 122A and 122B are preferably integral with the respective sides 70 and 72, in which shaft 122 is preferably integral with end fitting 52 in an illustrative embodiment. Ends 122A and 122B of shaft 122 can be welded to the respective sides 70 and 72 in an alternate embodiment. Shaft 122 is arranged about axis X of rotation, which extends through the geometric center of shaft 122 from end 122A to end 122B. Shaft 122 and axis X of rotation are parallel relative to proximal extremity 60, distal extremity 62, opening 80, and opening 120.

Extension 90A of inner end 90 of coupling 54 extends to collar 130, which encircles shaft 122 thereby pivotally connecting coupling 54 to end fitting 52 at opening 124 at the intermediate location of opening 124 and pivot 120 between opening 80 and distal extremity 62. Collar 130 resides in and extends across opening from proximate to end 122A affixed to side 70 to proximate to end 122B affixed to side 72, is parallel relative to proximal extremity 60, distal extremity 62, opening 80, opening 120, and shaft 122, and is free to rotate about shaft 122 about axis X of rotation between the lowered position of coupling 54 in FIGS. 7-9, in which coupling 54 extends downwardly from pivot 120 to outer end 92 beyond distal extremity 62 and outer surface 96 resides in juxtaposition with outer surface 66 between opening 124 and distal extremity 62, and the raised position of coupling 54 in FIGS. 10-12, in which coupling 54 extends upright from pivot 120 to outer end 92, inner surface 94 resides in juxtaposition with outer surface 66 between opening 124 and proximal extremity 60, outer end 92 is in juxtaposition with opening 80, and opening 110 is in juxtaposition with outer surface 66 between distal extremity 62 and both opening 80 and outer end 92 and, more particularly, between opening 124 and both opening 80 and outer end 92. Accordingly, outer end 92 of coupling 54 is over opening 80 of end fitting 52 and opening 110 of coupling 54 is offset from opening 80 between opening 80 and pivot 120, when coupling 54 is in its raised position.

End fitting assembly 50 is useful for securing tie-down strap 140 in FIGS. 13-21, whether the rear strap or the front strap described above, without requiring or having to form a secured or fixed loop in tie-down strap 140 such as by affixing free end 141 of tie-down strap 140 directly to a standing part 142 of tie-down strap 140 strap, whether by stitching, heat bonding, or the like, and without having to use specialized equipment or separate fasteners apart from end fitting assembly 50. The process of securing end fitting assembly 50 to tie-down strap 140 and the resulting tie-down strap and end fitting assembly 50 configuration will now be discussed.

Before securing tie-down strap 140 to end fitting assembly 50 it is useful to pivot coupling 54 to its intermediate or open position in FIGS. 1-5 between the lowered position in FIGS. 7-9 and the raised position in FIGS. 10-12. This enables the easy, quick and efficient installation of end fitting assembly 50 onto tie-down strap 140.

Figure 13:
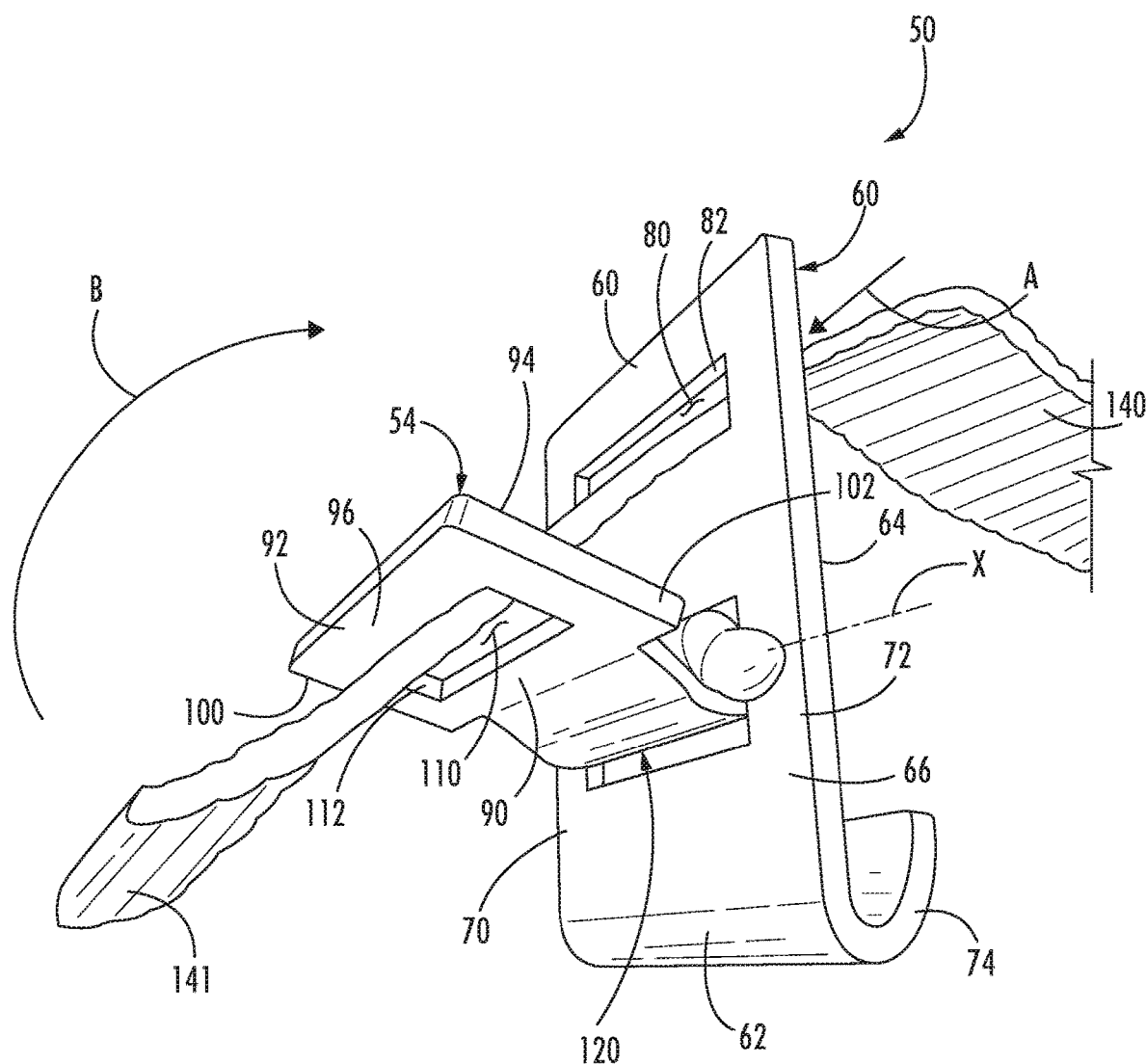
FIGS. 13-15 illustrate a sequence of events of installing the end fitting assembly of FIGS. 1-12 on a tie-down strap.

FIG. 13 shows end fitting assembly 50 with coupling 54 pivoted to its open position extending outwardly from outer surface 66 from inner end 90 to outer end 92. End 141 of tie-down strap 140 is threaded through opening 80 of end fitting 52 in the direction of arrow A from inner surface 64 to outer surface 66 and from opening 80 directly through opening 110 of coupling 54 in the same direction from inner surface 94 to outer surface 96. Having concurrently threaded end 141 through openings 80 and 110 in the direction of arrow C in FIG. 13 an putting a sufficient length of tie-down strap 140 through openings 80 and 110 so there will be ample tie-down strap 140 with which to secure end fitting assembly 50, end 141 is doubled back in direction of arrow B in FIGS. 13 and 14 and threaded through opening 80 in FIG. 14 in the direction of arrow C from outer surface 66 to inner surface 64 over standing part 142 of tie-down strap 140 extending through opening 80 and pulled in the direction of arrow C away from inner surface 64 of end fitting 52. This forms loop 145 in tie-down strap 140 that is looped around, and thereby lashed to, outer end 92 of coupling 54 and that extends outwardly from outer surface 66 of end fitting 52.

Openings 80 and 110 are slightly larger in width than the width of tie-down strap 140. Accordingly, when end 141 is doubled back through opening 80 over standing part 142 of tie-down strap 140 through opening 80 to form loop 145, the overlapping parts of tie-down strap 140 through opening 80, the part of tie-down strap 140 extending to end 141 and standing part 142 of tie-down strap 140, overlap one atop the other. Loop 145 extends outwardly from these overlapped or looped sections of tie-down strap 140 extending through opening 80 and away from outer surface 66 of end fitting 52 to outer end 92 of coupling 54 about which it is looped.

Figure 14:
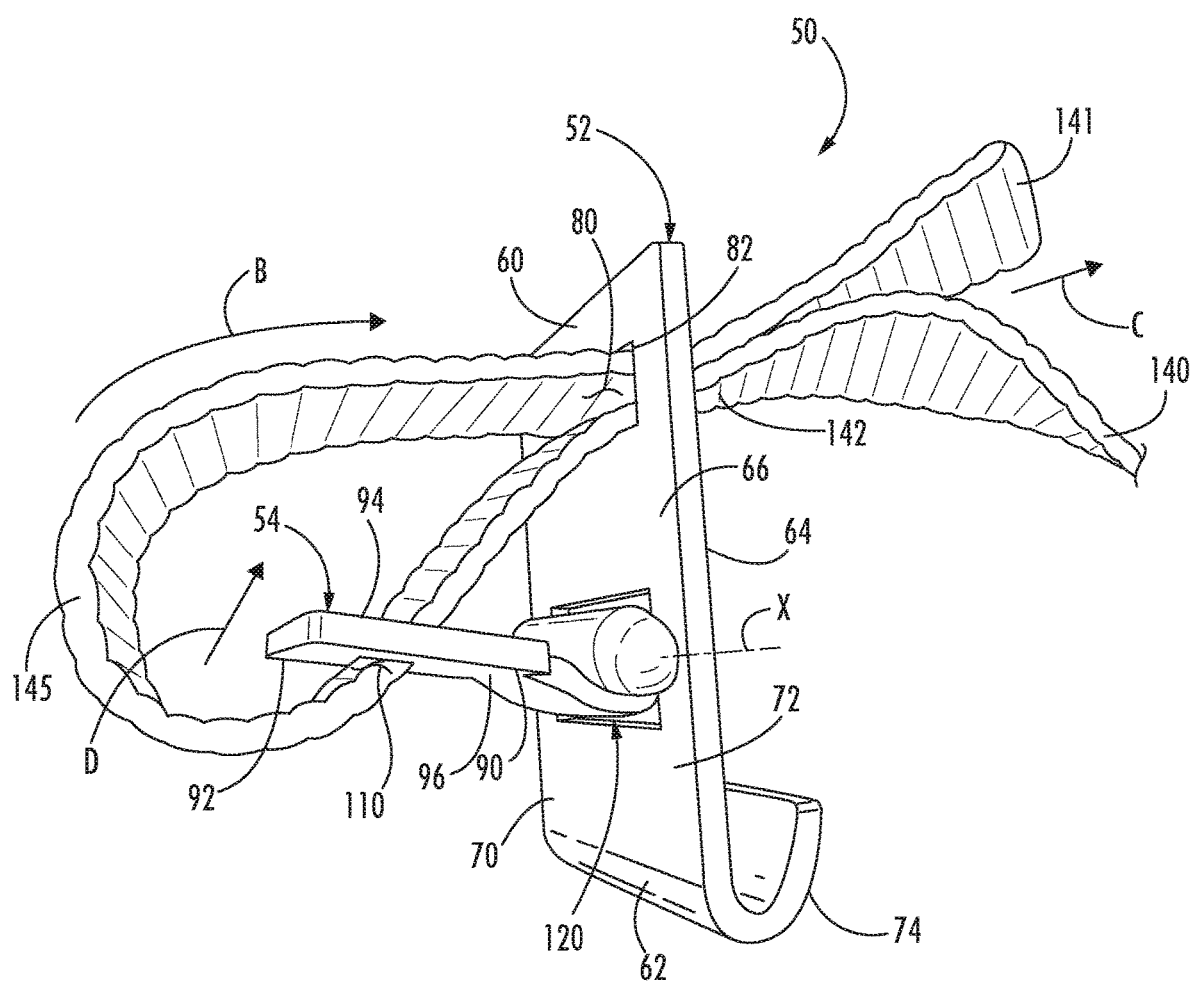

Loop 145 is ultimately secured to end fitting assembly 50 by tightening it. Referring to FIG. 14, this is done by pulling end 141 of tie-down strap in the direction of arrow C away from inner surface 64, in which the looped section of tie-down strap 140 through opening 80 is pulled through opening 80 over the standing part 142 of tie-down strap 140 in the direction of arrow C, by pulling standing part 142 in the direction of arrow C away from inner surface 64, in which the looped section of standing part 142 of tie-down strap 140 through opening 80 is pulled through opening 80 under the looped section of tie-down strap 14 extending to end 141 in the direction of arrow C, or by pulling end 141 and standing part 142 concurrently in the direction of arrow C away from inner surface 64, in which the looped sections of tie-down strap 140 extending through opening 80 are concurrently pulled through opening 80 in the direction of arrow C. Either of these methods is suitable to tighten loop 145 lashed to coupling 54 on the outer side of outer surface 66 of end fitting 52.

Figure 15:
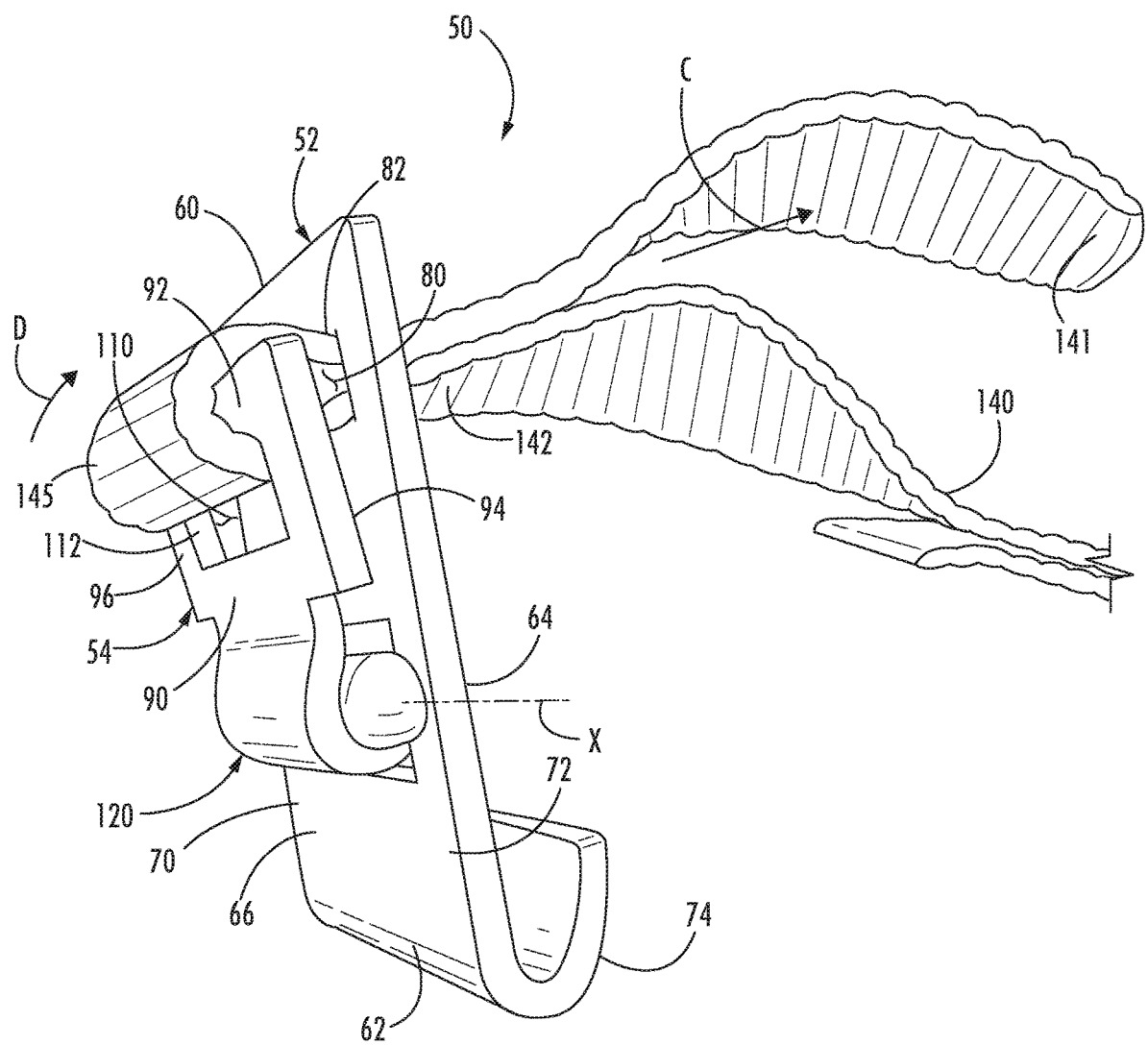
Figure 16:
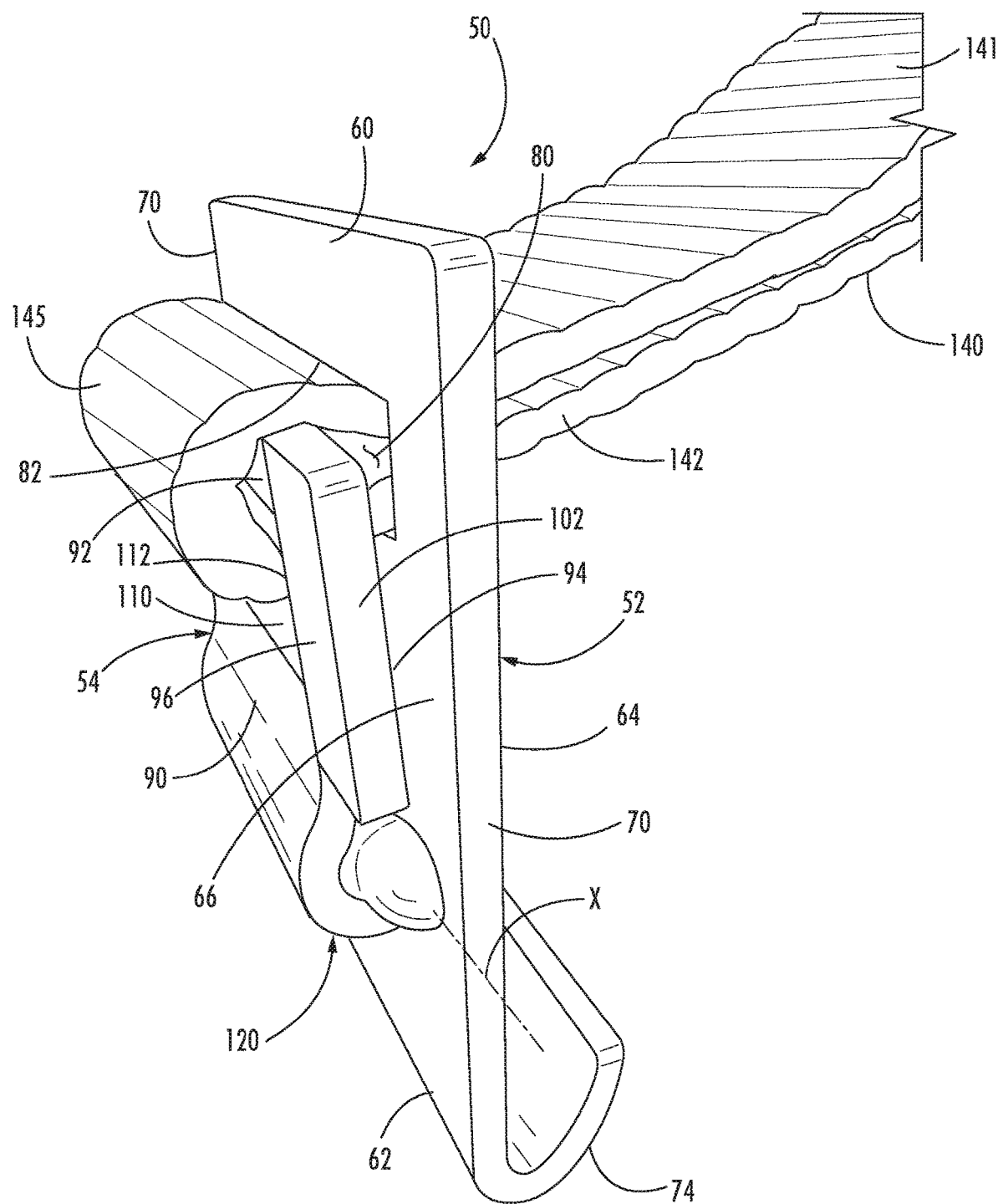
FIG. 16 is a perspective view corresponding to FIG. 15 illustrating a configuration of the end fitting assembly installed on the tie-down strap.
Figure 17:
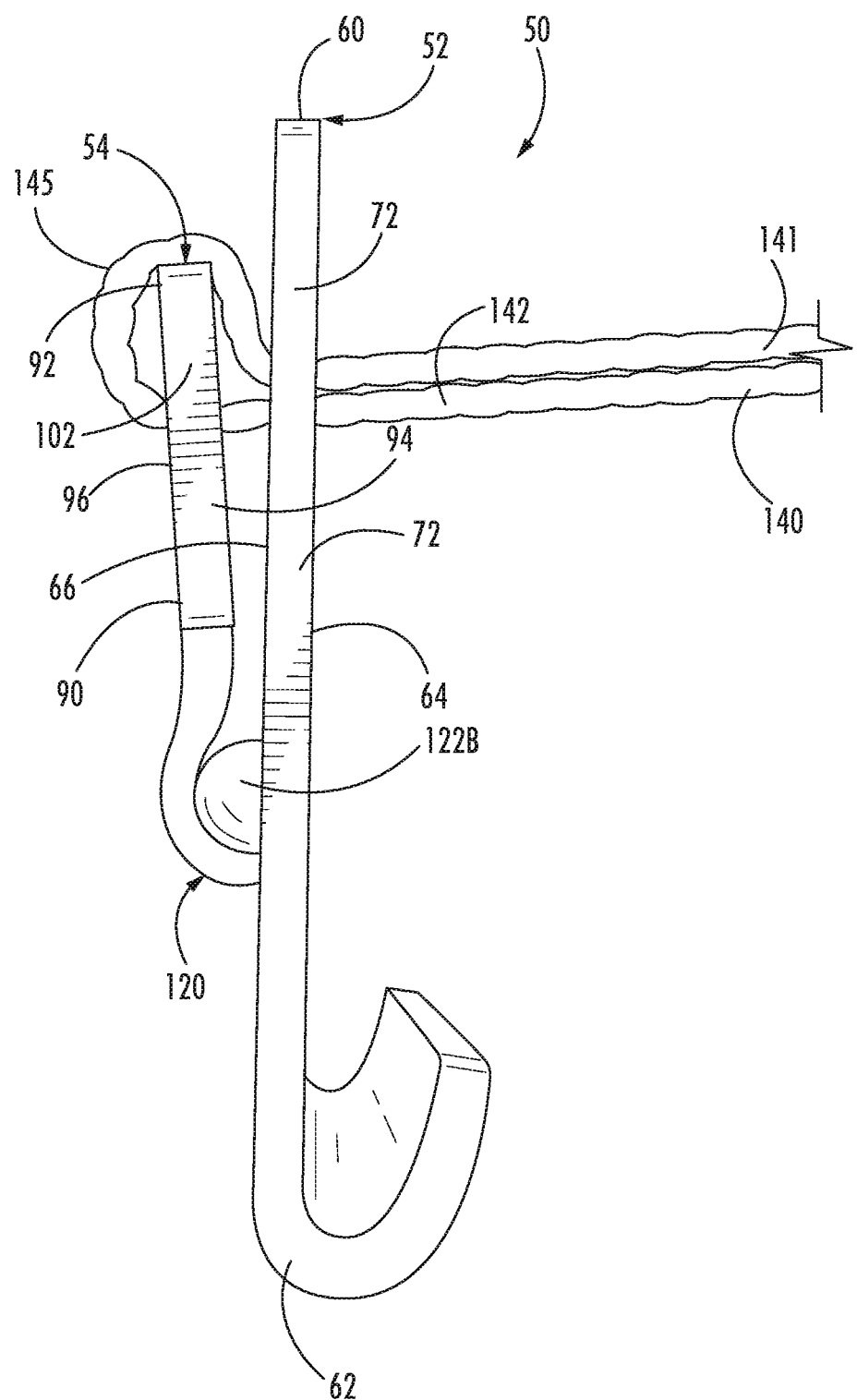
FIG. 17 is a side view of the embodiment of FIG. 16, the opposite side view being the mirror image thereof.
Figure 18:
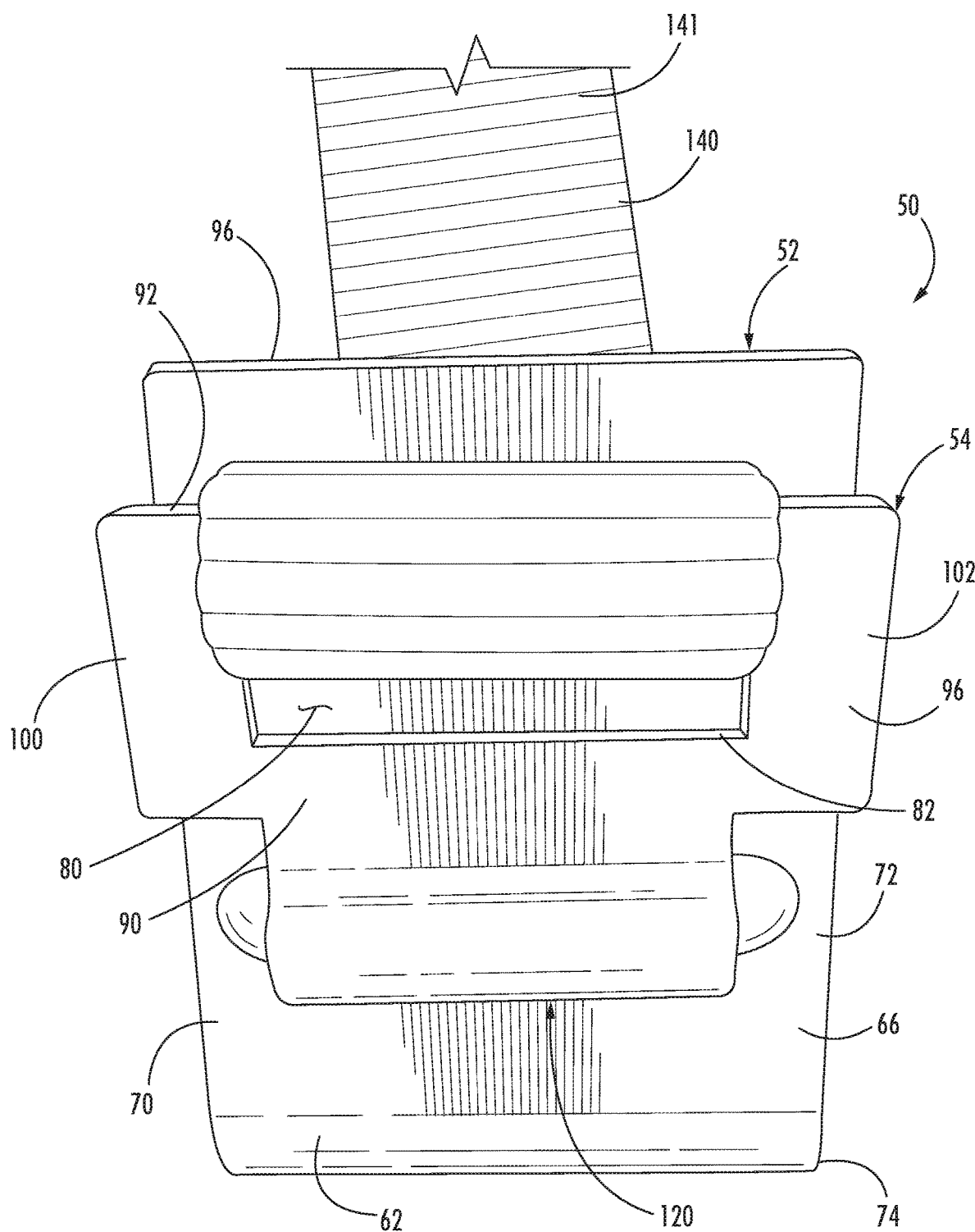
FIG. 18 is a front view of the embodiment of FIG. 16.
Figure 19:
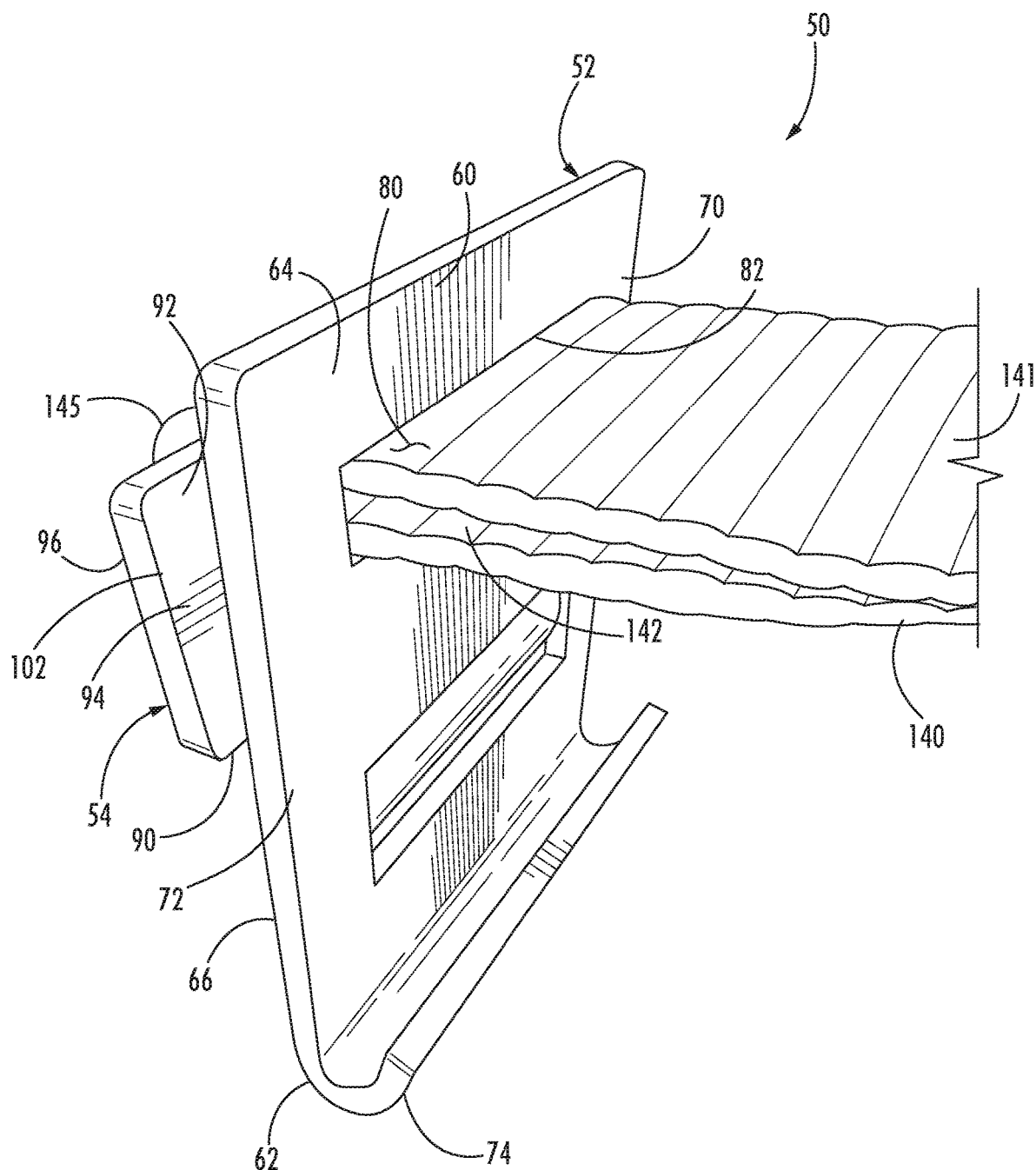
FIG. 19 is a rear perspective view of the embodiment of FIG. 16.

The tightening of loop 145 constricts it toward outer surface 66 of end fitting 52 in the direction of arrow C in FIGS. 14 and 15. The constricting loop 145 pulls outer end 92 toward outer surface 66 of end fitting 52 in the direction of arrow C, which pivots coupling 54 at pivot 120 about axis X of rotation in the direction of arrow D in FIGS. 14 and 15 toward outer surface 66 of end fitting 52 and its raised position in FIGS. 10-12 from its open position in FIG. 14 defining an open position of outer end 92 to a closed position of coupling 54 in FIG. 15 defining a closed position of outer end 92. Loop 145 is tightened until coupling 52 reaches its closed position just short of the raised position of coupling 54 in FIGS. 10-12, in which outer end 92 is in its closed in juxtaposition with and opposing opening 80 of end fitting 52 and coupling 54 is retrained from moving into its raised position by the inherent interference by loop 145 clamped or otherwise squeezed between inner surface 94 of coupling 54 and outer surface 66 of end fitting 52. This tightening of loop 145 releasably secures tie-down strap 140 to end fitting assembly and provides an inherent resistance to unravelling of loop 145 from end fitting assembly 50. The more loop 145 is tightened the harder it pulls against outer end 92 toward outer surface 66 and the harder loop 145 is pinched between inner surface 94 of outer end 92 on either side of perimeter edge 112 and outer surface 66 of end fitting 52 on either side of perimeter edge 82.

The pivot 120 connection of end fitting 52 to coupling 54 positioned in juxtaposition with outer surface 66 of end fitting 52 and the size of the tightened loop 145 lashed around outer end 92 of coupling 54 in the closed position of coupling 54 and its outer end 92 being sufficiently larger than opening 80 disable the structure of loop 145 tightened about outer end 92 of coupling 54 from being pulled through opening 80. This secures loop 145 thereby securing tie-down strap 140 to end-fitting assembly 50 forming a tie-down strap 140 and end fitting assembly 54 configuration in FIGS. 15-19 bearing appropriate reference characters referenced in this disclosure. To remove end fitting assembly 50 from tie-down strap 140, the foregoing operation need only be reversed.

The tie-down strap 140 and end fitting assembly 50 configuration in FIGS. 15-19 is characterized by end 141 of tie-down strap 140 threaded through opening 80 of end fitting 52 and opening of coupling 54, doubled back and threaded through opening 80 of end fitting 52 over standing part 142 of tie-down strap 140 to form loop 145 in tie-down strap 140 around outer end 92 and that extends outwardly from outer surface 66 of end fitting 52. Loop 145 so lashed to outer end 92 of coupling 52 is secured by being tightened about outer end 92 of coupling 54 as described above, which urges coupling 54 into the closed position of outer end 92. Coupling 54 is held by the tightened loop in its closed position and the closed position of outer end 92, which clamps or otherwise squeezes loop 145 between inner surface 94 of coupling 54 and outer surface 66 of end fitting 52, which secures loop 145 and provides an inherent resistance to unravelling of loop 145 from end fitting assembly 50.

Figure 20:
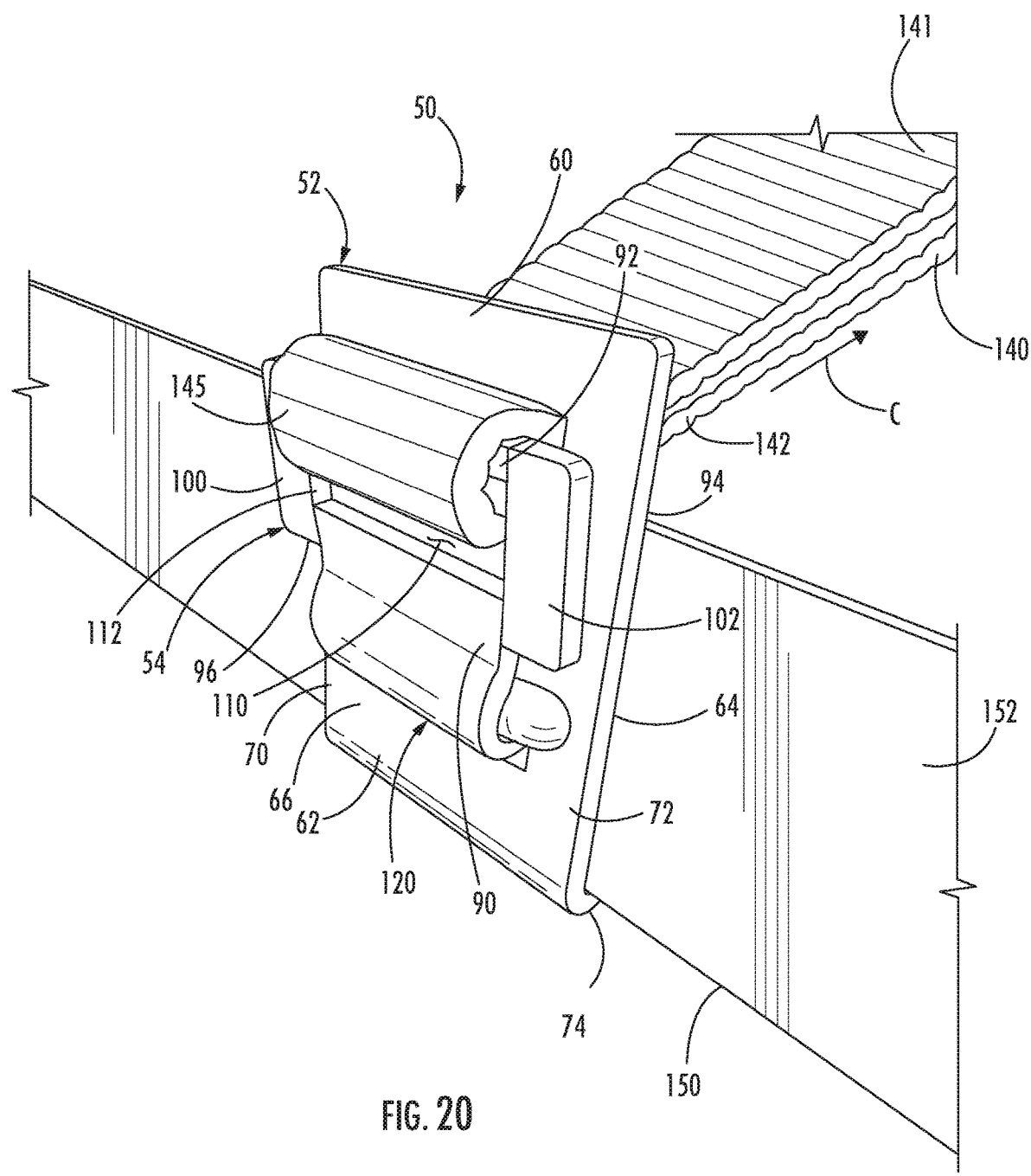
FIGS. 20 and 21 are front and rear perspective views, respectively, of the embodiment of FIG. 16 illustrating the end fitting secured to an anchor point.
Figure 21:
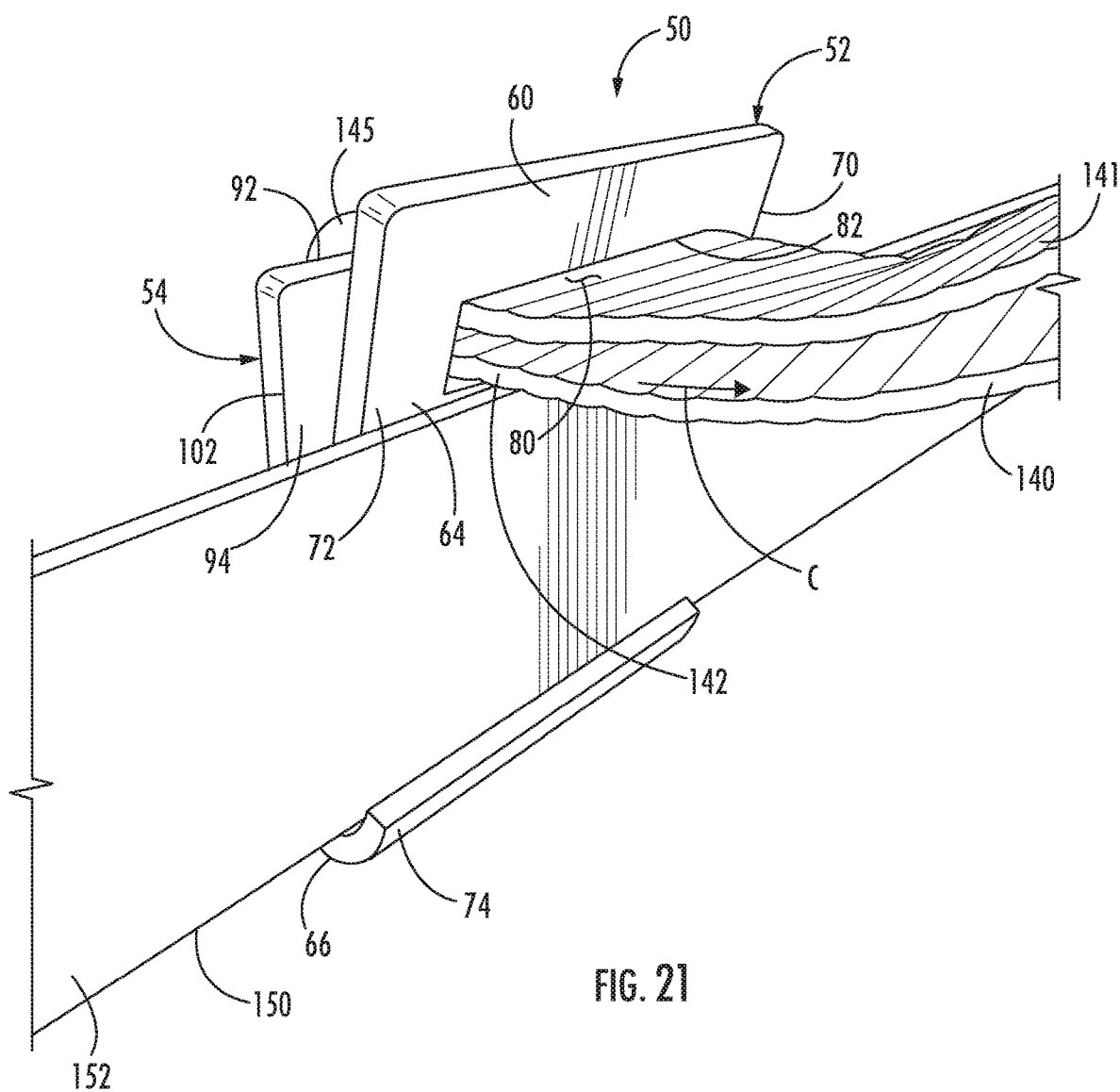

Having so threaded tie-down strap 140 through end fitting assembly 50 and lashed loop 145 to outer end 92 of coupling 52 and tightened it to secured end fitting assembly 50 to tie-down strap 140, hook 74 may be hooked over a securement point as shown in FIGS. 20 and 21 for securing tie-down strap 140 for securing a load in the application of a ratchet strap assembly discussed above, or a cam or over-the-center strap assembly in alternate embodiments. In the example of FIGS. 20 and 21. The securement point is a lower edge 150 of crossmember 152, in which hook 74 is hooked under lower edge 150, and inner surface 64 extends upright against crossmember 152 to opening 80 and proximal extremity 60. The more standing part 142 is tensioned over a load, i.e. pulled in the direction of arrow C in FIGS. 20 and 21 away from inner surface 64 of end fitting 52, the harder loop 145 is tightened. The harder loop 145 is tightened the harder it pulls against outer end 92 toward outer surface 66 and the harder loop 145 is pinched between inner surface 94 of outer end 92 on either side of perimeter edge 112 and outer surface 66 of end fitting 52 on either side of perimeter edge 82. Accordingly, loop 145 becomes more secure and more resistant to unravelling from end fitting assembly 50 the harder standing part 142 is pulled/tensioned over a load, thereby obviating any need to fix loop 145, such as by affixing end 141 to standing part 142 by stitching, heat bonding, or the like, and without having to use specialized equipment or separate fasteners.

The present invention is described above with reference to illustrative embodiments. However, those skilled in the art will recognize that changes and modifications may be made in the described embodiment without departing from the nature and scope of the present invention. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A tie-down strap and end fitting assembly configuration, comprising:
   a tie-down strap including an end;
   an end fitting including a proximal extremity, a distal extremity configured to secure an anchor point, and a first opening between the proximal extremity and the distal extremity;
   a coupling including an inner end, an outer end, and a second opening between the inner end and the outer end, the inner end being connected to the end fitting for movement of the coupling into and out of a closed position in which the outer end is in juxtaposition with the first opening and the second opening is in juxtaposition with the end fitting between the distal extremity and both the first opening and the outer end;
   the end of the tie-down strap is threaded through the first opening and the second opening and doubled back through the first opening over a standing part of the tie-down strap in which a loop is formed in the tie-down strap around the outer end, and the loop is secured by being tightened about the outer end by at least one of the end of the tie-down strap and the standing part of the tie-down strap being pulled, the coupling held in the closed position of the outer end by the loop being tightened; and
   the coupling connected to the end fitting for movement of the coupling into and out of the closed position by a pivot comprising a shaft carried by one of the end fitting and the coupling about which a collar of the other one of the end fitting and coupling rotates, the end fitting defines a third opening between the first opening and the distal extremity, and the shaft and the collar reside in the third opening.

2. The tie-down strap and the end fitting assembly configuration according to claim 1, wherein the shaft is integral with the one of the end fitting and the coupling.

3. The tie-down strap and the end fitting assembly configuration according to claim 1, wherein the first opening and the second opening are elongate and parallel with respect to one another.

4. A method, comprising:
   providing a tie-down strap including an end, an end fitting comprising a proximal extremity, a distal extremity configured to secure an anchor point, and a first opening between the proximal extremity and the distal extremity, and a coupling including an inner end, an outer end, and a second opening between the inner end and the outer end, the inner end being connected to the end fitting for movement of the coupling into and out of a closed position in which the outer end is in juxtaposition with the first opening and the second opening is in juxtaposition with the end fitting between the distal extremity and both the first opening and the outer end of the coupling;
   threading the end of the tie-down strap through the first opening and the second opening while the coupling is out of the closed position, doubling back the end of the tie-down strap through the first opening over a standing part of the tie-down strap through the first opening forming a loop in the tie-down strap around the outer end, and securing the loop by tightening it about the outer end thereby persuading movement of the coupling to the closed position of the outer end by pulling at least one of the end of the tie-down strap and the standing part of the tie-down strap; and the coupling connected to the end fitting for movement of the coupling into and out of the closed position by a pivot comprising a shaft carried by one of the end fitting and the coupling about which a collar of the other one of the end fitting and coupling rotates, the end fitting defines a third opening between the first opening and the distal extremity, and the shaft and the collar reside in the third opening.

5. The method according to claim 4, wherein the shaft is integral with the one of the end fitting and the coupling.

6. The method according to claim 4, wherein the first opening and the second opening are elongate and parallel with respect to one another.

* * * * *